(12) United States Patent
Wan et al.

(10) Patent No.: US 12,077,661 B2
(45) Date of Patent: Sep. 3, 2024

(54) HIGH STIFFNESS, CLARIFIED POLYPROPYLENE COMPOSITIONS HAVING IMPROVED PROPERTIES FOR FOOD PACKAGING

(71) Applicant: Winpak Ltd., Winnipeg (CA)

(72) Inventors: Chen Wan, Kingwood, TX (US); Ming-Lun Wu, Richmond, TX (US)

(73) Assignee: Winpak Ltd., Winnipeg (CA)

( * ) Notice: Subject to any disclaimer, the term of this patent is extended or adjusted under 35 U.S.C. 154(b) by 0 days.

(21) Appl. No.: 18/067,274

(22) Filed: Dec. 16, 2022

(65) Prior Publication Data

US 2023/0193005 A1    Jun. 22, 2023

Related U.S. Application Data

(60) Provisional application No. 63/265,602, filed on Dec. 17, 2021.

(51) Int. Cl.
*C08L 23/12* (2006.01)

(52) U.S. Cl.
CPC ......... *C08L 23/12* (2013.01); *C08L 2205/025* (2013.01)

(58) Field of Classification Search
CPC ............................ C08L 23/12; C08L 2205/025
See application file for complete search history.

(56) References Cited

U.S. PATENT DOCUMENTS

| 6,432,496 B1 | 8/2002 | Klosiewicz |
| 7,314,901 B2 | 1/2008 | Kuo et al. |
| 2004/0170854 A1* | 9/2004 | Kuo .................... B32B 27/32 428/515 |
| 2012/0060997 A1* | 3/2012 | Mitchell ............. B32B 27/32 156/60 |
| 2015/0336359 A1* | 11/2015 | Dou .................... B32B 27/32 428/516 |
| 2016/0060407 A1 | 3/2016 | Hoya et al. |
| 2017/0015821 A1 | 1/2017 | Dou et al. |
| 2017/0369688 A1 | 12/2017 | Donahue et al. |

(Continued)

FOREIGN PATENT DOCUMENTS

WO    2022228812 A1    11/2022

OTHER PUBLICATIONS

International Search Report and the Written Opinion of the International Searching Authority, International Patent Application No. PCT/IB2022/062408, pp. 1-10, dated Apr. 11, 2023.

*Primary Examiner* — Mark S Kaucher
(74) *Attorney, Agent, or Firm* — Bond, Schoeneck & King, PLLC

(57) ABSTRACT

Described herein are high stiffness, snappable food contact material compositions containing at least one polypropylene, a hydrocarbon resin, and optionally one or more other additives. The disclosed compositions exhibit a combination of mechanical, chemical, and/or optical properties that enable wider use of such polypropylene-based compositions in food packaging applications, including in Form-Fill-Seal food packaging where high stiffness, snappability, thin walls, and good clarity are important factors. Also described herein are articles comprising the disclosed compositions and methods of manufacturing such articles.

21 Claims, 15 Drawing Sheets

(56) References Cited

U.S. PATENT DOCUMENTS

2018/0305534 A1* 10/2018 Kalfus .................... C08L 23/12
2020/0139685 A1 5/2020 Strunk-Westermann et al.
2020/0215803 A1 7/2020 Dou et al.

* cited by examiner

HIGH STIFFNESS, CLARIFIED POLYPROPYLENE COMPOSITIONS HAVING IMPROVED PROPERTIES FOR FOOD PACKAGING

CROSS-REFERENCE TO RELATED APPLICATIONS

This application claims priority to and the benefit of U.S. Provisional Patent Application Ser. No. 63/265,602, filed on Dec. 17, 2021, and entitled "HIGH STIFFNESS, HIGH IMPACT POLYPROPYLENE COMPOSITIONS", which is hereby incorporated by reference in its entirety.

FIELD OF THE DISCLOSURE

The present disclosure is directed generally to high stiffness, clarified polypropylene compositions. More specifically, the present disclosure relates to high stiffness, transparent polypropylene compositions having improved clarity and thermoformability properties.

BACKGROUND

The global food packaging industry is governed at various national and international levels by a number of different organizations and regulations. Food contact materials (e.g., packaging materials that contact food) not only need to comply with the rules and regulations of these various organizations, but also need to provide a positive user experience. For example, it is known that food packaging can affect a consumer's overall experience and perception of the product being consumed. Further, depending on the application of the food contact material or product packaging in general, this may change what mechanical and/or chemical properties are desirable. In the rigid food packaging arena, polypropylene (PP) has been widely used as a material of choice, while other polymers such as polystyrene (PS) and polyethylene terephthalate (PET) are preferred in Form-Fill-Seal (FFS) food packaging applications because of their high stiffness, high clarity, high impact strength, and low shrinkage when compared with a polymer such as polypropylene. These and other drawbacks limit the potential applications for polypropylene where such properties are important factors.

SUMMARY OF THE DISCLOSURE

The present disclosure provides polypropylene compositions having improved properties and find particular application in the food packaging and related industries.

According to an embodiment of the present disclosure, a food contact material composition is provided. The food contact material composition comprises: from about 60 wt % to about 99.9 wt % of a polypropylene; and from about 0.1 wt % to about 15 wt % of a hydrocarbon resin.

In an aspect, the polypropylene comprises a first polypropylene and a second polypropylene, the first polypropylene being different from the second polypropylene.

In an aspect, the food contact material composition comprises from about 60 wt % to about 99 wt % of the first polypropylene and from about 1 wt % to about 40 wt % of the second polypropylene.

In an aspect, the first polypropylene has a melt flow rate of less than about 5 grams/10 minutes, according to ASTM D1238, and the second polypropylene has a melt flow rate of at least about 35 grams/10 minutes, according to ASTM D1238.

In an aspect, the food contact material composition comprises from about 5 wt % to about 12 wt % of the hydrocarbon resin.

In an aspect, the food contact material composition has a tensile modulus of at least about 2.5 GPa, measured according to ASTM D638.

In an aspect, the food contact material composition has a tensile strength of at least about 40 MPa, measured according to ASTM D638.

In an aspect, the food contact material composition has an Izod impact strength of less than about 20 J/m, measured according to ASTM D256.

In an aspect, the food contact material composition has a max elongation of less than 50%, measured according to ASTM D638.

In an aspect, the food contact material composition has at least one of a tensile modulus of at least about 2.5 GPa, measured according to ASTM D638, and a tensile strength of at least about 40 MPa, measured according to ASTM D638, and has at least one of an Izod impact strength of less than about 20 J/m, measured according to ASTM D256 and a max elongation of less than 50%, measured according to ASTM D638.

In an aspect, the food contact material composition has a water vapor transmission rate (WVTR) of less than 0.005 g/100 in$^2$/48 hr, measured according to ASTM F1249.

In an aspect, the food contact material composition has an oxygen transmission rate (OTR) of less than 0.07 cc/pkg/24 hr, measured according to ASTM F1307

In an aspect, the food contact material composition has a haze value of less than about 80% when extruded as a sheet, measured according to ASTM D1003.

In an aspect, the food contact material composition further comprises from about 0.02 wt % to about 5 wt % of a nucleating agent.

According to another embodiment of the present disclosure, a food contact material composition having improved stiffness, snappability, barrier properties, thermoformability, and/or optical properties, the food contact material composition consisting essentially of: from about 60 wt % to about 99 wt % of a first polypropylene; from about 1 wt % to about 40 wt % of a second polypropylene that is different from the first polypropylene; and from about 0.1 wt % to about 15 wt % of a hydrocarbon resin.

According to another embodiment of the present disclosure, a food packaging article having a surface suitable for contacting a food product, the food packaging article being formed from a food contact material composition as described herein.

In an aspect, the food packaging article is transparent, or has a thin wall having a cross-sectional thickness of 3 mm or less.

According to another embodiment of the present disclosure, a method of manufacturing a food packaging article suitable for contacting a food product is provided. The method comprises: forming a batch mixture comprising a food contact material composition; extruding the batch mixture into a processable form; and forming a fillable food packaging article from the processable form of the batch mixture; wherein the food contact material composition comprises from about 60 wt % to about 99.9 wt % of a polypropylene and from about 0.1 wt % to about 20 wt % of a hydrocarbon resin.

In an aspect, extruding the batch mixture into a processable form comprises extruding the batch mixture into a sheet, and forming the fillable food packaging article comprises thermoforming the extruded sheet into a desired shape.

In an aspect, the food contact material composition comprises from about 60 wt % to about 99 wt % of a first polypropylene, from about 1 wt % to about 40 wt % of a second polypropylene that is different from the first polypropylene, and from about 0.1 wt % to about 20 wt % of a hydrocarbon resin.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

Figure 1:
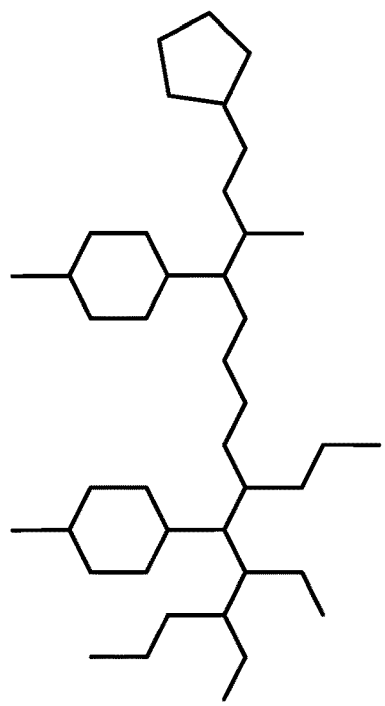
FIG. 1 illustrates the full hydrogenation of a C5 aliphatic hydrocarbon resin according to aspects of the present disclosure.
Figure 1:
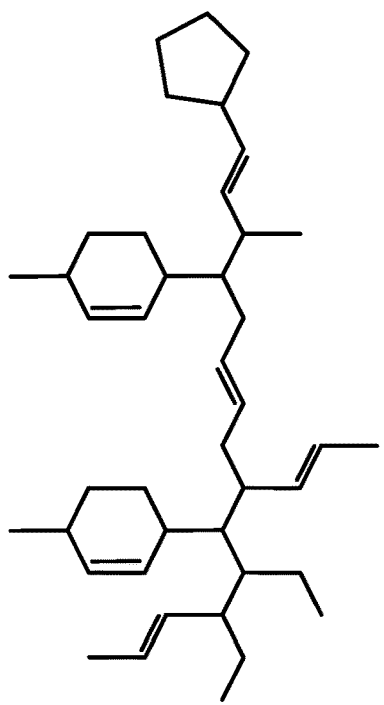

As mentioned above, the intended application of a food contact material or product packaging in general can change what mechanical and/or chemical properties are desirable. While polypropylene has been widely used in rigid food packaging applications, other food contact materials such as polystyrene (PS) and polyethylene terephthalate (PET) are preferred in Form-Fill-Seal (FFS) food packaging applications. This is because, when compared with polystyrene for example, polypropylene has lower stiffness, worse clarity, higher shrinkage, and lower snappability. In general, some of these shortcomings may be addressed by changing the parameters of the polymer used. However, changing one parameter often changes other properties. For example, increasing the molecular weight of a polypropylene can increase stiffness but will result in high viscosity and reduced processability. In another example, adding an inorganic filler into a polypropylene may increase stiffness but reduce impact strength and clarity.

As described herein, it has been advantageously found that certain polypropylene compositions exhibit a combination of mechanical, chemical, and/or optical properties that enable use of such polypropylene compositions in food packaging applications other than rigid food packaging, such as FFS food packaging. In particular, the present disclosure is directed to compositions containing polypropylene having one or more improved mechanical and optical properties when compared with other compositions containing polypropylene and/or other polymers. The compositions described herein find particular application in the food packaging industry and FFS food packaging where high stiffness, minimal shrinkage, thin walls, good clarity and multi-pack breakability (i.e., snappability), are important factors. The disclosed compositions also maintain and/or provide improved processability, such as improved thermoformability.

Accordingly, provided herein are compositions comprising at least one polypropylene, a hydrocarbon resin, and optionally one or more other additives, such as a nucleating agent. In embodiments, the compositions may be a food contact material (FCM) composition that is used to form a food contact material (FCM) and/or a food packaging article.

In embodiments, the FCM compositions of the present disclosure include a polypropylene, i.e., at least one polymer formed by the polymerization of at least propylene ($CH_2$=$CHCH_3$) monomers, thereby having the repeating unit according to Formula (1):

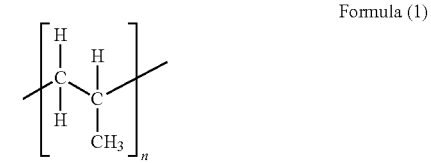

Formula (1)

wherein n is an integer greater than zero.

In embodiments, the polypropylene can have a melt flow rate (MFR) of at least about 30 g/10 min. when measured according to ASTM D1238, including at least about 35 g/10 min., at least about 40 g/10 min., at least about 45 g/10 min., at least about 50 g/10 min., at least about 55 g/10 min., at least about 60 g/10 min., at least about 65 g/10 min., at least about 70 g/10 min., at least about 75 g/10 min., at least about 80 g/10 min., at least about 85 g/10 min., at least about 90 g/10 min., and/or ranges having any combination of endpoints thereof.

In other aspects, the polypropylene can have a melt flow rate (MFR) of less than about 10 g/10 min. when measured according to ASTM D1238, including less than about 9 g/10 min., less than about 8 g/10 min., less than about 7 g/10 min., less than about 6 g/10 min., less than about 5 g/10 min., less than about 4 g/10 min., less than about 3.0 g/10 min., less than about 2.5 g/10 min., less than about 2.0 g/10 min., less than about 1.5 g/10 min., and/or ranges having any combination of endpoints thereof.

In embodiments, the polypropylene can be a homopolymer, a random copolymer, or a block copolymer. For example, a polypropylene copolymer can have units X and O units arranged in regular or repeating sequences (e.g., -X-O-X-O-X-O-, -X-X-X-O-O-O-, etc.), or arranged randomly (e.g., -X-X-O-X-O-X-O-O-X-O-, etc.). The polypropylenes can include from about 0.1 mol % to about 99.9 mol % of each selected monomer unit, including from about 1 mol % to about 99 mol %, from about 5 mol % to about 95 mol %, from about 10 mol % to about 90 mol %, from about 15 mol % to about 85 mol %, from about 20 mol % to about 80 mol %, from about 25 mol % to about 75 mol %, from about 30 mol % to about 70 mol %, from about 35 mol % to about 65 mol %, from about 40 mol % to about 60 mol %, from about 45 mol % to about 55 mol %, and about 50 mol %. The mole percent of each of the monomers of a polypropylene copolymer can be determined using peak area values determined by $^{13}C$ nuclear magnetic resonance (NMR) spectroscopy, for example. In specific aspects, the polypropylene can be a copolymer comprising repeating units derived from propylene ($CH_2$=$CHCH_3$) and ethylene ($CH_2$=$CH_2$).

The polypropylene can further be an isotactic polypropylene, a syndiotactic polypropylene, or an atactic polypropylene. In still further aspects, the polypropylene can be a nucleated polypropylene or an un-nucleated polypropylene.

In embodiments, the FCM compositions can include from about 60 wt % to about 99.9 wt % of the polypropylene based on the total weight of the composition. For example, the compositions can include from about 80 wt % to about 99.9 wt % of the polypropylene based on the total weight of the composition, including about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 95.5 wt %, about 96 wt %, about 96.5 wt %, about 97 wt %, about 97.5 wt %, about 98 wt %, about 98.5 wt %, about 99 wt %. about 99.5 wt %, about 99.9 wt %, and ranges having any combination of endpoints thereof.

In particular embodiments, the FCM compositions may comprise at least one polypropylene, as described above, wherein the at least one polypropylene comprises a first polypropylene and a second polypropylene. Put another way, the FCM compositions of the present disclosure may comprise at least a first polypropylene and at least a second polypropylene that is different from the first polypropylene.

In embodiments, the FCM composition comprises from about 60 wt % to about 99 wt % of the first polypropylene based on the total weight of the FCM composition, including about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, and ranges with any combination of endpoints thereof.

In embodiments, the FCM composition comprises from about 1 wt % to about 40 wt % of the second polypropylene based on the total weight of the composition, including about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, and ranges with any combination of endpoints thereof.

In particular embodiments, the first polypropylene is different from the second polypropylene. For example, the FCM composition can comprise a first polypropylene having a melt flow rate of at least about 30 g/10 min., and can further comprise a second polypropylene having a melt flow rate of less than about 5 g/10 min. In some embodiments, the first polypropylene can have a melt flow rate of at least about 35 g/10 min., at least about 40 g/10 min., at least about 45 g/10 min., at least about 50 g/10 min., at least about 55 g/10 min., at least about 60 g/10 min., at least about 65 g/10 min., at least about 70 g/10 min., at least about 75 g/10 min., at least about 80 g/10 min., at least about 85 g/10 min., at least about 90 g/10 min., and/or ranges having any combination of endpoints thereof. In further embodiments, the second polypropylene can have a melt flow rate of less than about 9 g/10 min., less than about 8 g/10 min., less than about 7 g/10 min., less than about 6 g/10 min., less than about 5 g/10 min., less than about 4 g/10 min., less than about 3.0 g/10 min., less than about 2.5 g/10 min., less than about 2.0 g/10 min., less than about 1.5 g/10 min., and/or ranges having any combination of endpoints thereof.

As described herein, the FCM compositions of the present disclosure further comprise a hydrocarbon resin. In embodiments, the hydrocarbon resin is a low molecular weight thermoplastic polymer produced by the polymerization of unsaturated hydrocarbons. In embodiments, hydrocarbon resins of the present disclosure may be aliphatic or aromatic. For example, C5 aliphatic hydrocarbon resins can be formed by polymerizing a monomer like piperylene and/or its derivatives (e.g., cis/trans 1,3-pentadienes, 2-methyl-2-butene, cyclopentene, cyclopentadiene, and dicyclopentadiene) to form an oligomeric resin. Likewise, C9 aromatic hydrocarbon resins can be formed by polymerizing a C9 aromatic hydrocarbon like indene, methylindene, dicyclopentadiene, styrene, alpha-methyl styrene, vinyl toluenes, and the like to form an oligomeric resin. The chemical structures of several of these monomers are illustrated below:

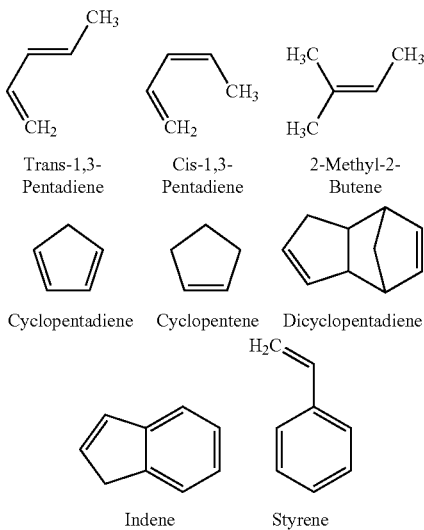

Figure 2:
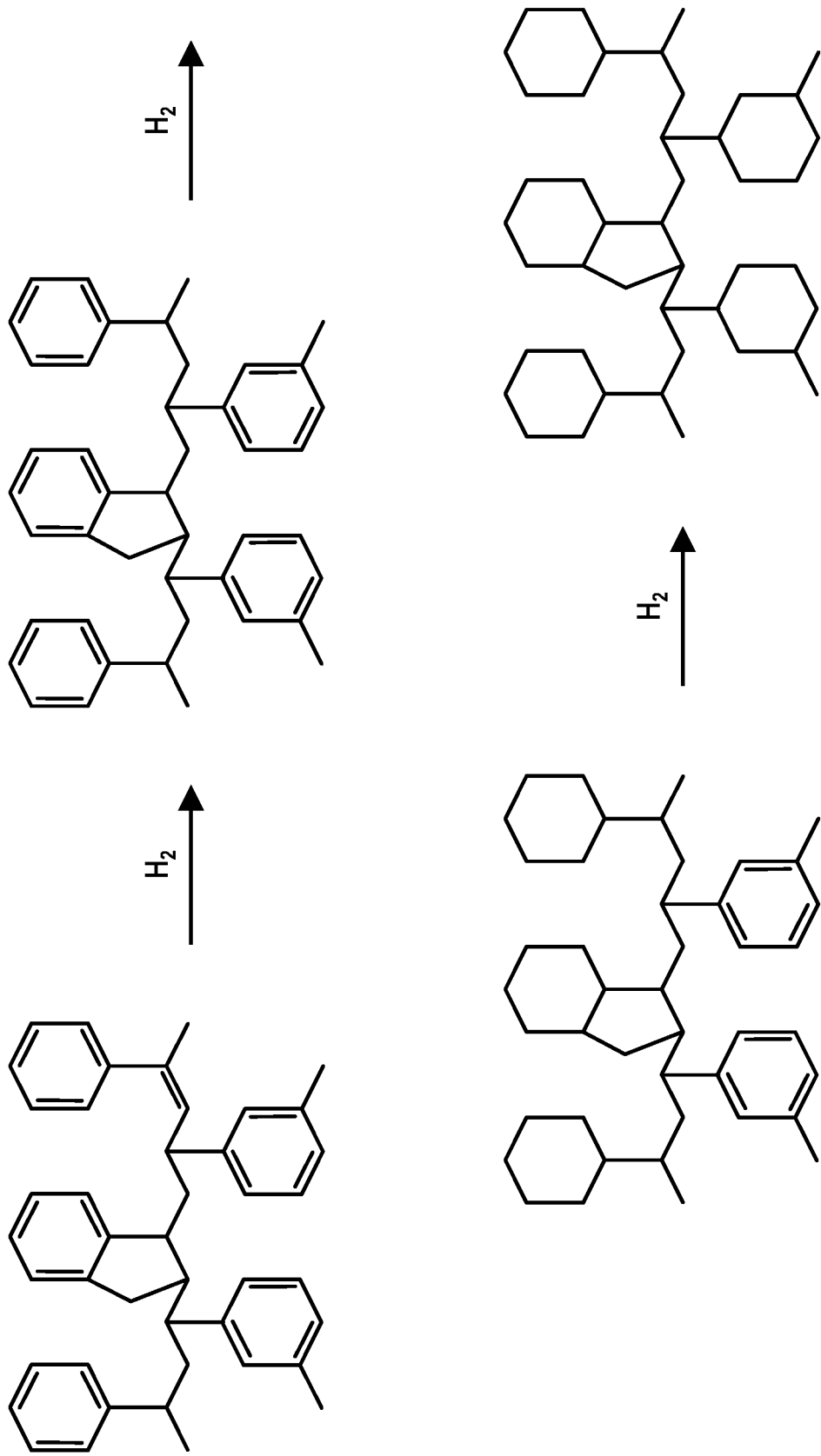
FIG. 2 illustrates the partial and full hydrogenation of a C9 aromatic hydrocarbon resin according to aspects of the present disclosure.

With reference to FIG. 1 and FIG. 2, the hydrocarbon resin can be un-hydrogenated, partially hydrogenated, or fully hydrogenated. As shown in FIG. 1, for example, a C5 aliphatic hydrocarbon resin having multiple carbon-carbon double bonds is reacted with hydrogen ($H_2$), optionally in the presence of a catalyst such as nickel or palladium, thereby removing these carbon-carbon double bonds. Although FIG. 1 illustrates the fully hydrogenation of the C5 aliphatic hydrocarbon resin, it should be appreciated that the hydrocarbon resin may be partially hydrogenated. For example, as shown in FIG. 2, a C9 aromatic hydrocarbon resin is repeatedly reacted with hydrogen ($H_2$), optionally in the presence of a catalyst, each time removing additional carbon-carbon double bonds.

In particular embodiments, the hydrocarbon resin can have a softening point defined according to ASTM E28. For example, in some embodiments, the hydrocarbon resin can have a softening point of from about 130° C. to about 150° C., measured according to ASTM E28, including from about 130° C. to about 132° C., from about 132° C. to about 134° C., from about 134° C. to about 136° C., from about 136° C. to about 138° C., from about 138° C. to about 140° C., from about 140° C. to about 142° C., from about 142° C. to about 144° C., from about 144° C. to about 146° C., from about 146° C. to about 148° C., from about 148° C. to about 150° C., and ranges having any combination of endpoints thereof.

In embodiments, the hydrocarbon resin can form from about 0.1 wt % to about 20 wt % of the FCM composition. That is, the FCM compositions of the present disclosure may comprise from about 0.1 wt % to about 20 wt % of the hydrocarbon resin, based on the total weight of the FCM composition. In particular embodiments, the FCM composition may comprise from about 0.1 wt % to about 1 wt % of the hydrocarbon resin, from about 1 wt % to about 2 wt %, from about 2 wt % to about 3 wt %, from about 3 wt % to about 4 wt %, from about 4 wt % to about 5 wt %, from about 5 wt % to about 6 wt %, from about 6 wt % to about 7 wt %, from about 7 wt % to about 8 wt %, from about 8 wt % to about 9 wt %, from about 9 wt % to about 10 wt %, from about 10 wt % to about 11 wt %, from about 12 wt % to about 13 wt %, from about 13 wt % to about 14 wt %, from about 14 wt % to about 15 wt %, from about 15 wt % to about 16 wt %, from about 16 wt % to about 17 wt %, from about 17 wt % to about 18 wt %, from about 18 wt % to about 19 wt %, from about 19 wt % to about 20 wt %, and/or ranges having any combination of endpoints thereof.

As described herein, the FCM compositions of the present disclosure may further comprise at least one nucleating agent. In embodiments, the nucleating agent can include sodium benzoate, organophosphates, kaolin, sorbitol derivatives, pimelic acid salts, benzene-trisamides, HPN-600ei or HPN-68L, polymeric nucleating agent such as PEs, and the like, including combinations thereof.

In embodiments, the FCM compositions can include at least about 0.02 wt % of the nucleating agent based on the total weight of the composition. In further aspects, including about 0.02 wt %, about 0.03 wt %, about 0.04 wt %, about 0.05 wt %, about 0.06 wt %, about 0.07 wt %, about 0.08 wt %, about 0.09 wt %, about 0.1 wt %, about 0.2 wt %, about 0.3 wt %, about 0.4 wt %, about 0.5 wt %, about 0.6 wt %, about 0.7 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, and ranges having any combination of endpoints thereof.

In some embodiments, the FCM compositions can further include one or more additives depending on the application of the composition. For example, the one or more additives can include one or more stabilizers, antioxidants, acid scavengers, flame retardants, impact modifiers, fillers, clarifiers, UV stabilizers, release agents, plasticizers, lubricants, anti-statics, anti-microbials, heat stabilizers, and/or colorants. For example, the composition can comprise from about 0 wt % to about 10 wt % of the one or more additives based on the total weight of the composition, including from about 0 wt % to about 1 wt %, from about 1 wt % to about 2 wt %, from about 2 wt % to about 3 wt %, from about 3 wt % to about 4 wt %, from about 4 wt % to about 5 wt %, from about 5 wt % to about 6 wt %, from about 6 wt % to about 7 wt %, from about 7 wt % to about 8 wt %, from about 8 wt % to about 9 wt %, from about 9 wt % to about 10 wt %, and any combination of endpoints thereof.

In other embodiments, the compositions disclosed herein exclude one or more of these additives. That is, the compositions of the present disclosure can be substantially free from one or more stabilizers, antioxidants, acid scavengers, flame retardants, impact modifiers, fillers (e.g., inorganic fillers), clarifiers, UV stabilizers, release agents, plasticizers, lubricants, anti-statics, anti-microbials, heat stabilizers, and/or colorants. As used herein, the term "substantially free from" means the composition contains about 0 wt % of the additive(s) based on the total weight of the composition. As such, the additive(s) may be present in no more than trace amounts and do not affect the properties of the composition.

As described herein, the FCM compositions advantageously achieve a synergistic combination of properties, including improved mechanical properties, optical properties, and processability that enable use of such polypropylene-containing compositions in a wider array of food packaging. In particular, the disclosed compositions achieve improved properties in one or more of improved stiffness, impact strength, clarity, haze, processability, and shrinkage without the incurring drawbacks to other properties, such as reduced processability, clarity, and/or sustainability.

In embodiments, the FCM compositions described herein can have a tensile modulus of at least about 2.3 GPa when measured according to ASTM D638, including about 2.32 GPa, about 2.34 GPa, about 2.36 GPa, about 2.38 GPa, about 2.4 GPa, about 2.42 GPa, about 2.44 GPa, about 2.46 GPa, about 2.48 GPa, about 2.5 GPa, about 2.52 GPa, about 2.54 GPa, about 2.56 GPa, about 2.58 GPa, about 2.6 GPa, about 2.62 GPa, about 2.64 GPa, about 2.66 GPa, about 2.68 GPa, about 2.7 GPa, about 2.72 GPa, about 2.74 GPa, about 2.76 GPa, about 2.78 GPa, about 2.8 GPa, about 2.82 GPa, about 2.84 GPa, about 2.86 GPa, about 2.88 GPa, about 2.9 GPa, about 2.92 GPa, about 2.94 GPa, about 2.96 GPa, about 2.98 GPa, about 3 GPa, about 3.02 GPa, about 3.04 GPa, about 3.06 GPa, about 3.08 GPa, about 3.1 GPa, about 3.12 GPa, about 3.14 GPa, about 3.16 GPa, about 3.18 GPa, about 3.2 GPa, about 3.22 GPa, about 3.24 GPa, about 3.26 GPa, about 3.28 GPa, about 3.3 GPa, about 3.32 GPa, about 3.34 GPa, about 3.36 GPa, about 3.38 GPa, about 3.4 GPa, about 3.42 GPa, about 3.44 GPa, about 3.46 GPa, about 3.48 GPa, about 3.5 GPa, about 3.52 GPa, about 3.54 GPa, about 3.56 GPa, about 3.58 GPa, about 3.6 GPa, about 3.62 GPa, about 3.64 GPa, about 3.66 GPa, about 3.68 GPa, about 3.7 GPa, about 3.72 GPa, about 3.74 GPa, about 3.76 GPa, about 3.78 GPa, about 3.8 GPa, about 3.82 GPa, about 3.84 GPa, about 3.86 GPa, about 3.88 GPa, about 3.9 GPa, about 3.92 GPa, about 3.94 GPa, about 3.96 GPa, about 3.98 GPa, about 4 GPa, and ranges having any combination of endpoints thereof.

In embodiments, the FCM compositions described herein can have a tensile strength of at least about 38 MPa when measured according to ASTM D638, including about 38.2 MPa, about 38.4 MPa, about 38.6 MPa, about 38.8 MPa, about 39 MPa, about 39.2 MPa, about 39.4 MPa, about 39.6 MPa, about 39.8 MPa, about 40 MPa, about 40.2 MPa, about 40.4 MPa, about 40.6 MPa, about 40.8 MPa, about 41 MPa, about 41.2 MPa, about 41.4 MPa, about 41.6 MPa, about 41.8 MPa, about 42 MPa, about 42.2 MPa, about 42.4 MPa, about 42.6 MPa, about 42.8 MPa, about 43 MPa, about 43.2 MPa, about 43.4 MPa, about 43.6 MPa, about 43.8 MPa, about 44 MPa, about 44.2 MPa, about 44.4 MPa, about 44.6 MPa, about 44.8 MPa, about 45 MPa, about 45.2 MPa, about 45.4 MPa, about 45.6 MPa, about 45.8 MPa, about 46 MPa, about 46.2 MPa, about 46.4 MPa, about 46.6 MPa, about 46.8 MPa, about 47 MPa, about 47.2 MPa, about 47.4 MPa, about 47.6 MPa, about 47.8 MPa, about 48 MPa, about 48.2 MPa, about 48.4 MPa, about 48.6 MPa, about 48.8 MPa, about 49 MPa, about 49.2 MPa, about 49.4 MPa, about 49.6 MPa, about 49.8 MPa, about 50 MPa, about 50.2 MPa, about 50.4 MPa, about 50.6 MPa, about 50.8 MPa, about 51 MPa, about 51.2 MPa, about 51.4 MPa, about 51.6 MPa, about 51.8 MPa, about 52 MPa, about 52.2 MPa, about 52.4 MPa, about 52.6 MPa, about 52.8 MPa, about 53 MPa, about 53.2 MPa, about 53.4 MPa, about 53.6 MPa, about 53.8 MPa, about 54 MPa, about 54.2 MPa, about 54.4 MPa, about 54.6 MPa, about 54.8 MPa, about 55 MPa, and ranges having any combination of endpoints thereof.

In embodiments, the FCM compositions described herein can have a max elongation of less than about 56% when measured according to ASTM D638, including about 55%, about 54%, about 53%, about 52%, about 51%, about 50%, about 49%, about 48%, about 47%, about 46%, about 45%, about 44%, about 43%, about 42%, about 41%, about 40%, about 39%, about 38%, about 37%, about 36%, about 35%, about 34%, about 33%, about 32%, about 31%, about 30%, about 29%, about 28%, about 27%, about 26%, about 25%, about 24%, about 23%, about 22%, about 21%, about 20%, about 19%, about 18%, about 17%, about 16%, about 15%, about 14%, about 13%, about 12%, about 11%, about 10%, about 9%, about 8%, about 7%, about 6%, about 5%, and ranges having any combination of endpoints thereof.

In embodiments, the FCM compositions described herein can have a water vapor transmission rate (WVTR) of less than about 0.005 g/100 in$^2$/48 hr when measured according to ASTM F1249, including about 0.005 g/100 in$^2$/48 hr, about 0.00495 g/100 in$^2$/48 hr, about 0.0049 g/100 in$^2$/48 hr, about 0.00485 g/100 in$^2$/48 hr, about 0.0048 g/100 in$^2$/48 hr, about 0.00475 g/100 in$^2$/48 hr, about 0.0047 g/100 in$^2$/48 hr, about 0.00465 g/100 in$^2$/48 hr, about 0.0046 g/100 in$^2$/48 hr, about 0.00455 g/100 in$^2$/48 hr, about 0.0045 g/100 in$^2$/48 hr, about 0.00445 g/100 in$^2$/48 hr, about 0.0044 g/100 in$^2$/48 hr, about 0.00435 g/100 in$^2$/48 hr, about 0.0043 g/100 in$^2$/48 hr, about 0.00425 g/100 in$^2$/48 hr, about 0.0042 g/100 in$^2$/48 hr, about 0.00415 g/100 in$^2$/48 hr, about 0.0041 g/100 in$^2$/48 hr, about 0.00405 g/100 in$^2$/48 hr, about 0.004 g/100 in$^2$/48 hr, about 0.00395 g/100 in$^2$/48 hr, about 0.0039 g/100 in$^2$/48 hr, about 0.00385 g/100 in$^2$/48 hr, about 0.0038 g/100 in$^2$/48 hr, about 0.00375 g/100 in$^2$/48 hr, about 0.0037 g/100 in$^2$/48 hr, about 0.00365 g/100 in$^2$/48 hr, about 0.0036 g/100 in$^2$/48 hr, about 0.00355 g/100 in$^2$/48 hr, about 0.0035 g/100 in$^2$/48 hr, about 0.00345 g/100 in$^2$/48 hr, about 0.0034 g/100 in$^2$/48 hr, about 0.00335 g/100 in$^2$/48 hr, about 0.0033 g/100 in$^2$/48 hr, about 0.00325 g/100 in$^2$/48 hr, about 0.0032 g/100 in$^2$/48 hr, about 0.00315 g/100 in$^2$/48 hr, about 0.0031 g/100 in$^2$/48 hr, about 0.00305 g/100 in$^2$/48 hr, about 0.003 g/100 in$^2$/48 hr, and ranges having any combination of endpoints thereof.

In embodiments, the FCM compositions described herein can have an oxygen transmission rate (OTR) of less than about 0.07 cc/pkg/24 hr when measured according to ASTM F1307, including about 0.069 cc/pkg/24 hr, about 0.068 cc/pkg/24 hr, about 0.067 cc/pkg/24 hr, about 0.066 cc/pkg/24 hr, about 0.065 cc/pkg/24 hr, about 0.064 cc/pkg/24 hr, about 0.063 cc/pkg/24 hr, about 0.062 cc/pkg/24 hr, about 0.061 cc/pkg/24 hr, about 0.06 cc/pkg/24 hr, about 0.059 cc/pkg/24 hr, about 0.058 cc/pkg/24 hr, about 0.057 cc/pkg/24 hr, about 0.056 cc/pkg/24 hr, about 0.055 cc/pkg/24 hr, about 0.054 cc/pkg/24 hr, about 0.053 cc/pkg/24 hr, about 0.052 cc/pkg/24 hr, about 0.051 cc/pkg/24 hr, about 0.05 cc/pkg/24 hr, about 0.049 cc/pkg/24 hr, about 0.048 cc/pkg/24 hr, about 0.047 cc/pkg/24 hr, about 0.046 cc/pkg/24 hr, about 0.045 cc/pkg/24 hr, about 0.044 cc/pkg/24 hr, about 0.043 cc/pkg/24 hr, about 0.042 cc/pkg/24 hr, about 0.041 cc/pkg/24 hr, about 0.04 cc/pkg/24 hr, about 0.039 cc/pkg/24 hr, about 0.038 cc/pkg/24 hr, about 0.037 cc/pkg/24 hr, about 0.036 cc/pkg/24 hr, about 0.035 cc/pkg/24 hr, about 0.034 cc/pkg/24 hr, about 0.033 cc/pkg/24 hr, about 0.032 cc/pkg/24 hr, about 0.031 cc/pkg/24 hr, about 0.03 cc/pkg/24 hr, and ranges having any combination of endpoints thereof.

In embodiments, the FCM compositions described herein can have a machine direction (MD) flexural modulus of at least about 2100 MPa when measured according to ASTM D790 (1% secant, about 23° C.), including about 2100 MPa, about 2110 MPa, about 2120 MPa, about 2130 MPa, about 2140 MPa, about 2150 MPa, about 2160 MPa, about 2170 MPa, about 2180 MPa, about 2190 MPa, about 2200 MPa, about 2210 MPa, about 2220 MPa, about 2230 MPa, about 2240 MPa, about 2250 MPa, about 2260 MPa, about 2270 MPa, about 2280 MPa, about 2290 MPa, about 2300 MPa, about 2310 MPa, about 2320 MPa, about 2330 MPa, about 2340 MPa, about 2350 MPa, about 2360 MPa, about 2370 MPa, about 2380 MPa, about 2390 MPa, about 2400 MPa, about 2410 MPa, about 2420 MPa, about 2430 MPa, about 2440 MPa, about 2450 MPa, about 2460 MPa, about 2470 MPa, about 2480 MPa, about 2490 MPa, about 2500 MPa, and ranges having any combination of endpoints thereof.

In embodiments, the FCM compositions described herein can have a transverse direction (TD) flexural modulus of at least about 2100 MPa when measured according to ASTM D790 (1% secant, about 23° C.), including about 2100 MPa, about 2110 MPa, about 2120 MPa, about 2130 MPa, about 2140 MPa, about 2150 MPa, about 2160 MPa, about 2170 MPa, about 2180 MPa, about 2190 MPa, about 2200 MPa, about 2210 MPa, about 2220 MPa, about 2230 MPa, about 2240 MPa, about 2250 MPa, about 2260 MPa, about 2270 MPa, about 2280 MPa, about 2290 MPa, about 2300 MPa, about 2310 MPa, about 2320 MPa, about 2330 MPa, about 2340 MPa, about 2350 MPa, about 2360 MPa, about 2370 MPa, about 2380 MPa, about 2390 MPa, about 2400 MPa, about 2410 MPa, about 2420 MPa, about 2430 MPa, about 2440 MPa, about 2450 MPa, about 2460 MPa, about 2470 MPa, about 2480 MPa, about 2490 MPa, about 2500 MPa, and ranges having any combination of endpoints thereof.

In some embodiments, the FCM compositions described herein can have an impact strength of less than about 27 J/m when measured according to Izod Impact Test (ASTM D256), including about 27 J/m, about 26 J/m, about 25 J/m, about 24 J/m, about 23 J/m, about 22 J/m, about 21 J/m, about 20 J/m, about 19 J/m, about 18 J/m, about 17 J/m, about 16 J/m, about 15 J/m, about 14 J/m, about 13 J/m, about 12 J/m, about 11 J/m, about 10 J/m, about 9 J/m, about 8 J/m, about 7 J/m, about 6 J/m, about 5 J/m, and ranges having any combination of endpoints thereof.

In embodiments, the FCM compositions described herein can have a multiaxial impact peak force of at least 2000 Newtons when measured according to ISO-6603-2 (at 2.2 meters/second), including about 2000 Newtons, about 2010 Newtons, about 2020 Newtons, about 2030 Newtons, about 2040 Newtons, about 2050 Newtons, about 2060 Newtons, about 2070 Newtons, about 2080 Newtons, about 2090 Newtons, about 2100 Newtons, about 2110 Newtons, about 2120 Newtons, about 2130 Newtons, about 2140 Newtons, about 2150 Newtons, about 2160 Newtons, about 2170 Newtons, about 2180 Newtons, about 2190 Newtons, about 2200 Newtons, about 2210 Newtons, about 2220 Newtons, about 2230 Newtons, about 2240 Newtons, about 2250 Newtons, about 2260 Newtons, about 2270 Newtons, about 2280 Newtons, about 2290 Newtons, about 2300 Newtons, about 2310 Newtons, about 2320 Newtons, about 2330 Newtons, about 2340 Newtons, about 2350 Newtons, about 2360 Newtons, about 2370 Newtons, about 2380 Newtons, about 2390 Newtons, about 2400 Newtons, and ranges having any combination of endpoints thereof.

In embodiments, the FCM compositions described herein can have a multiaxial impact total energy of at least 12 Joules when measured according to ISO 6603-2 (at 2.2 meters/second), including about 12.0 J, about 12.2 J, about 12.4 J, about 12.6 J, about 12.8 J, about 13.0 J, about 13.2 J, about 13.4 J, about 13.6 J, about 13.8 J, about 14.0 J, about 14.2 J, about 14.4 J, about 14.6 J, about 14.8 J, about 15.0 J, about 15.2 J, about 15.4 J, about 15.6 J, about 15.8 J, about 16.0 J, about 16.2 J, about 16.4 J, about 16.6 J, about 16.8 J, about 17.0 J, about 17.2 J, about 17.4 J, about 17.6 J, about 17.8 J, about 18.0 J, about 18.2 J, about 18.4 J, about 18.6 J, about 18.8 J, about 19.0 J, about 19.2 J, about 19.4 J, about 19.6 J, about 19.8 J, about 20 J, and ranges having any combination of endpoints thereof.

In embodiments, the FCM compositions described herein can have a haze value of less than about 80% when extruded as a sheet having a thickness of about 47 mils (i.e., about 1.2 mm) and measured according to ASTM D1003, including about 80%, about 78%, about 76%, about 74%, about 72%, about 70%, about 68%, about 66%, about 64%, about 62%, about 60%, about 58%, about 56%, about 54%, about 52%, about 50%, about 48%, about 46%, about 44%, about 42%, about 40%, and ranges having any combination of endpoints thereof.

In embodiments, the FCM compositions described herein can have a haze value of less than 20% when thermoformed into a thin-walled deli cup (e.g., about 2 inch height, about 3 inch diameter at the bottom, and about 3.5 inch diameter at the top) having a wall thickness of about 10 mils (i.e., about 0.25 mm) and measured according to ASTM D1003, including about 20%, about 19.8%, about 19.6%, about 19.4%, about 19.2%, about 19%, about 18.8%, about 18.6%, about 18.4%, about 18.2%, about 18%, about 17.8%, about 17.6%, about 17.4%, about 17.2%, about 17%, about 16.8%, about 16.6%, about 16.4%, about 16.2%, about 16%, about 15.8%, about 15.6%, about 15.4%, about 15.2%, about 15%, about 14.8%, about 14.6%, about 14.4%, about 14.2%, about 14%, about 13.8%, about 13.6%, about 13.4%, about 13.2%, about 13%, about 12.8%, about 12.6%, about 12.4%, about 12.2%, about 12%, about 11.8%, about 11.6%, about 11.4%, about 11.2%, about 11%, about 10.8%, about 10.6%, about 10.4%, about 10.2%, about 10%, about 9.8%, about 9.6%, about 9.4%, about 9.2%, about 9%, about 8.8%, about 8.6%, about 8.4%, about 8.2%, about 8%, about 7.8%, about 7.6%, about 7.4%, about 7.2%, about 7%, about 6.8%, about 6.6%, about 6.4%, about 6.2%, about 6%, about 5.8%, about 5.6%, about 5.4%, about 5.2%, about 5%, and ranges having any combination of endpoints thereof.

In embodiments, the FCM compositions described herein can have a rim diameter shrinkage, measured as a function of the difference between the rim diameter of a fully conditioned cup and the mold dimensions, of less than about 3.0%, including about 3.00%, about 2.95%, about 2.90%, about 2.85%, about 2.80%, about 2.75%, about 2.70%, about 2.65%, about 2.60%, about 2.55%, about 2.50%, about 2.45%, about 2.40%, about 2.35%, about 2.30%, about 2.25%, about 2.20%, about 2.15%, about 2.10%, about 2.05%, about 2.00%, about 1.95%, about 1.90%, about 1.85%, about 1.80%, about 1.75%, about 1.70%, about 1.65%, about 1.60%, about 1.55%, about 1.50%, about 1.45%, about 1.40%, about 1.35%, about 1.30%, about 1.25%, about 1.20%, about 1.15%, about 1.10%, about 1.05%, about 1.00%, and ranges having any combination of endpoints thereof.

In embodiments, the FCM compositions described herein can achieve a combination of the properties described above, including the stiffness (e.g., tensile modulus, tensile strength, flexural modulus, flexural strength), impact (e.g., peak force and total energy), physical (e.g., rim diameter shrinkage), and optical (e.g., haze) properties.

Also disclosed herein are food packaging articles formed from the FCM compositions described above. In particular, the food packaging articles of the present disclosure are suitable for storing and contacting food (i.e., having at least one surface suitable for contacting a food product). In some embodiments, the food packaging article can be, for example and without limitation, a cup, a tube, a packet, and/or the like. In embodiments, the food packaging article may be single-use. In particular embodiments, the food product can comprise a solid, a liquid, and/or a semi-liquid foodstuff. For example, in some embodiments, the food product can include, but is not limited to, yogurt, a condiment, a dip, a sauce, a dressing, and/or the like.

Figure 3B:
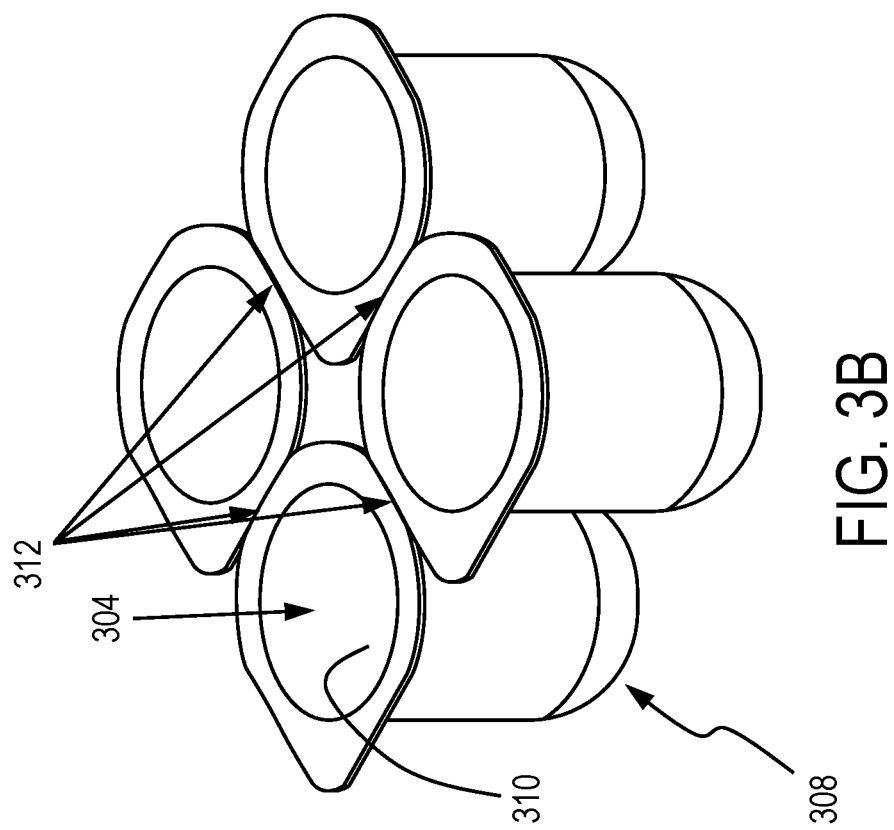
FIG. 3B is a perspective view of multiple food packaging articles formed from a food contact material composition according to aspects of the present disclosure.
Figure 3A:
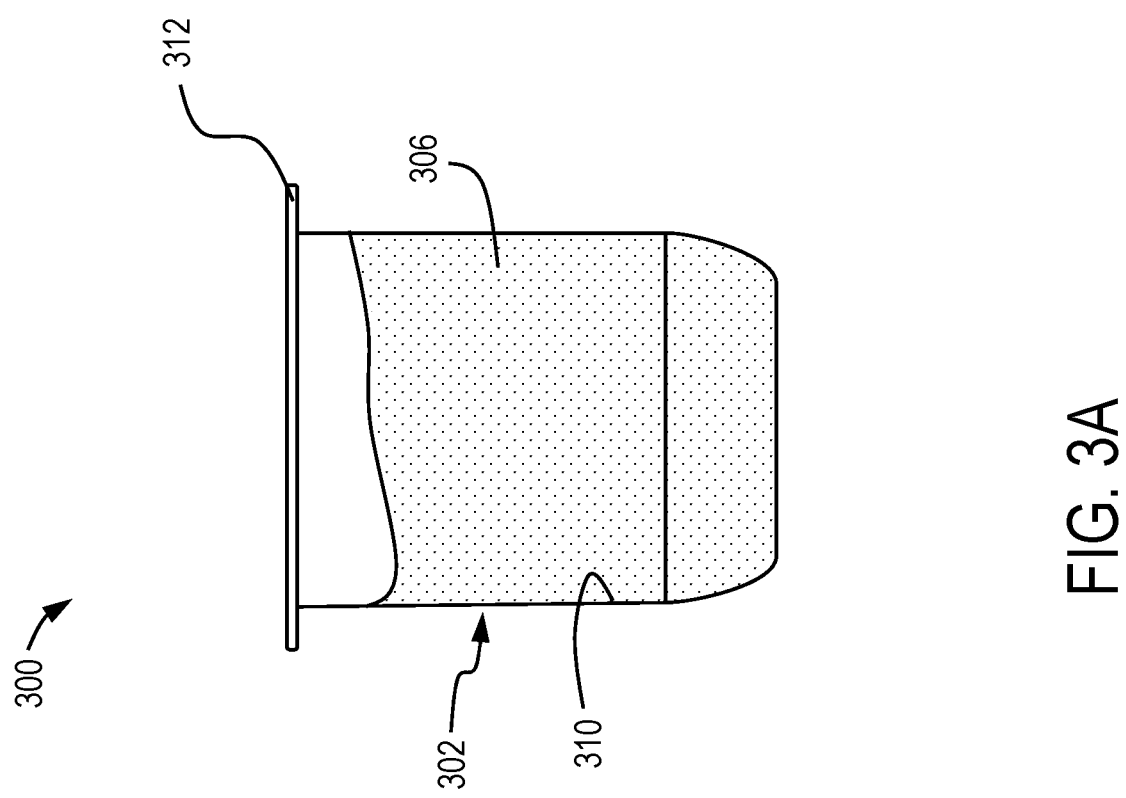
FIG. 3A is a diagram illustrating a food packaging article formed from a food contact material composition according to aspects of the present disclosure.

For example, with reference to FIGS. 3A and 3B, an exemplary food packaging article 300 and a cross-sectional view of the food packaging article 300 are illustrated according to aspects of the present disclosure. In embodiments, the food packaging article 300 comprises a vessel portion 302 having an interior volume 304 configured to store a food product 306. In some embodiments, the vessel portion 302 may comprise sidewalls 308 formed from an FCM composition of the present disclosure. The sidewalls 308 can include a thin wall having a cross-sectional thickness of about 5 mm or less, including about 4 mm, about 3 mm, about 2 mm, and ranges having any combination of endpoints thereof. In further embodiments, the sidewalls 308 may be transparent. In further embodiments, the sidewalls 308 can have at least one surface 310 suitable for contact with the food product 306.

In embodiments, food packaging article 300 further comprises a snappable portion 312 that enables the release of the food product 306 from the vessel portion 302 when a certain force is applied to the snappable portion 312. For example, in the example of FIG. 3A, snapping the snappable portion 312 may break-off or otherwise open-up a channel 314 that enables the release of the food product 306 from the vessel portion 302. In embodiments, the snappable portion 312 may also be formed from an FCM composition of the present disclosure, and can be transparent.

In particular embodiments, the food packaging articles (e.g., article 300) formed from the FCM compositions described above meet applicable regulatory standards. For example, the polypropylenes used to manufacture the food packaging articles of the present disclosure can comply with U.S. Food and Drug Administration (FDA) regulations under 21 C.F.R. § 177.1520. In further embodiments, the additives in the food packaging articles of the present disclosure can comply with FDA regulations 21 C.F.R. § 178.2010. In still further embodiments, the food packaging articles of the present disclosure can be safely used a component of packaging that contacts all food types described in Table 1 and Conditions of Use B-H described in Table 2 of 21 C.F.R. § 176.170(c).

Figure 4:
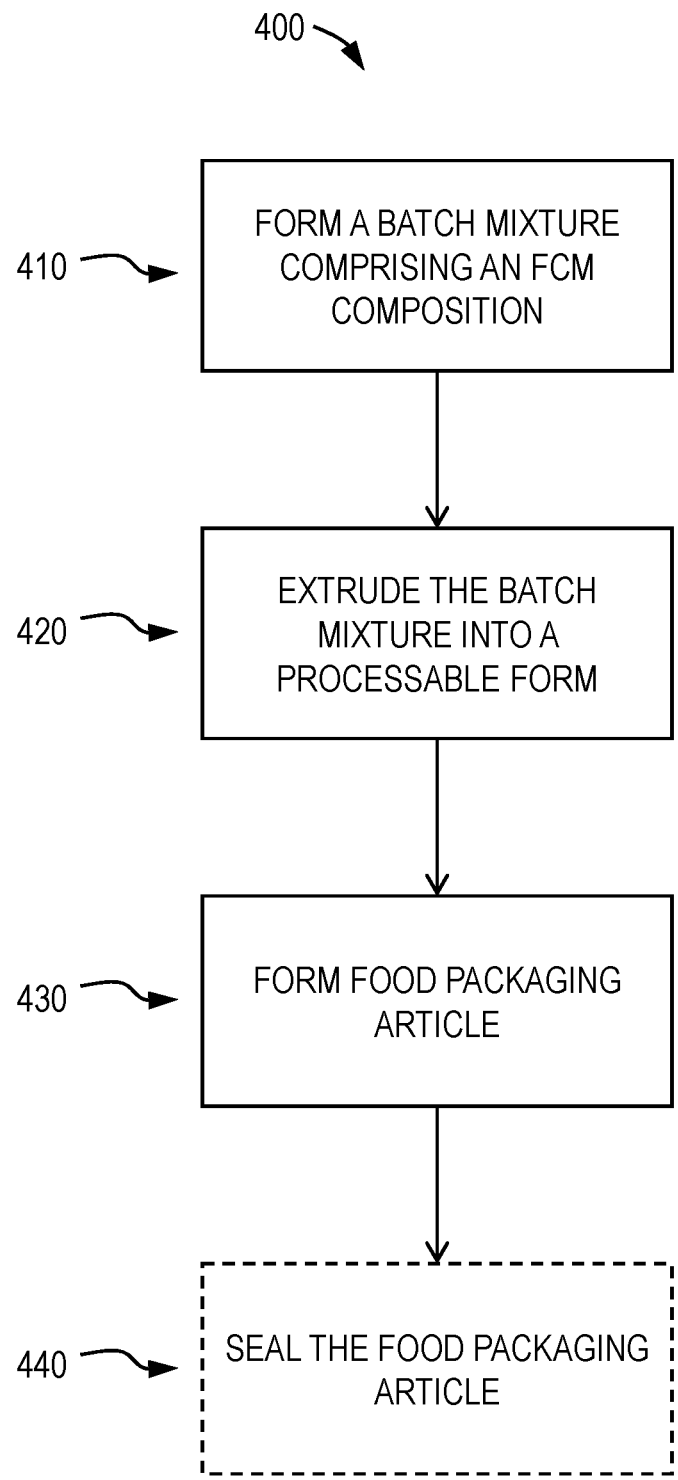
FIG. 4 is a flowchart illustrating a method of manufacturing a food packaging article according to aspects of the present disclosure.

Also provided herein are methods of manufacturing a food packaging article suitable for contacting a food product. For example, with reference to FIG. 4, a method 400 of manufacturing a food packaging article (e.g., article 300) suitable for contacting a food product (e.g., foodstuff 306). In embodiments, the method 400 comprises: in a step 410, forming a batch mixture comprising an FCM composition; in a step 420, extruding the batch mixture into a processable form; in a step 430, forming a food packaging article using the processable form of the batch mixture; and, optionally, in a step 440, sealing the food packaging article.

In embodiments, the step 410 includes forming a batch mixture comprising an FCM composition in accordance with the various aspects of the present disclosure. In particular embodiments, the FCM composition comprises from about 60 wt % to about 99 wt % of a first polypropylene, from about 1 wt % to about 40 wt % of a second polypropylene that is different from the first polypropylene, and from about 0.1 wt % to about 15 wt % of a hydrocarbon resin. In embodiments, each of the components may be provided separately combined, blended, or otherwise mixed together to form the FCM composition used in the batch mixture. In some embodiments, a mixer or other low shear process can be used to form the batch mixture.

In embodiments, the step 420 includes extruding the batch mixture using an extrusion machine and forming the batch mixture into a processable form. For example, in some embodiments, the batch mixture may be extruded, quenched, in a water bath, and pelletized. In other embodiments, the batch mixture may be extruded into sheets or thin sheets (e.g., having a thickness of less than 5 mm as described above).

In embodiments, the step 430 includes forming a fillable food packaging article using the processable form of the batch mixture. In some embodiments, the fillable food packaging article may be formed by molding, injection molding, overmolding, extrusion, rotational molding, and/or blow molding the processable form of the batch mixture into the desired shape. In particular embodiments, the fillable food packaging article may be formed by thermoforming the processable form of the batch mixture. In embodiments, the food packaging article may be thermoformed at a temperature less than about 165° C., including about 160° C., about 155° C., about 150° C., about 145° C., and/or ranges having any combination of endpoints thereof.

It should be appreciated that due to its semi-crystalline structure, polypropylene typically requires more heat and takes longer time to be thermoformed at similar conditions and sample sizes when compared to that of polystyrene, which is amorphous and has less enthalpy. Further, the lack of strain hardening of polypropylene also generally results in worse melt strength when compared to polystyrene and thereby severely limits its thermoforming window. However, the FCM compositions of the present disclosure exhibit improved processability and thermoformability. Without being limited by theory, it is believed that: (i) the addition of the hydrocarbon resin component reduces the crystallinity of the final product due to an amorphous state of the hydrocarbon resin, thereby reducing the amount of heat necessary to melt the composition; and (ii) the hydrocarbon resin may form a heat transfer network that improves the heat flow, thereby allowing a sheet of material to reach thermoforming temperatures more rapidly.

Further, it should be appreciated that the fillable food packaging article can take one or more desired shapes, including but not limited to, a cup, a tube, a packet, and/or the like. In particular embodiments, the fillable food packaging article may comprise an opening or unsealed portion that enables the fillable food packaging article to be filled with a food product (e.g., a solid, a liquid, and/or a semi-liquid foodstuff, etc.).

In embodiments, the method 400 optionally includes the step 440, wherein the fillable food packaging article is sealed the opening or the unsealed portion of the fillable article to form a final food packaging article (e.g., article 300). In particular embodiments, the fillable food packaging article may be filled with a food product prior to sealing the fillable article. In some embodiments, the fillable article or a portion thereof can be sealed using one or more sealing techniques (e.g., heat sealing, conduction sealing, induction sealing, adhesive sealing, ultrasonic bonding, welding, laser sealing, and combinations thereof).

As described herein, this disclosure presents multiple aspects that are further illustrated by the following non-limiting examples.

EXAMPLES

Examples 1-4

All measurements for the following examples were taken at room temperature (~23° C.) unless noted herein or otherwise specified in the corresponding standard protocol. Stiffness of the compositions was evaluated by measuring tensile strength and tensile modulus according to ASTM D638. Multiaxial impact properties were evaluated by measuring Peak force and total energy according to ISO 6603-2 at 2.2 m/sec. Clarity was evaluated by measuring haze of the composition according to ASTM D1003. Melt flow rate was measured according to ASTM D1238. Water vapor transmission rate and oxygen transmission rate were measured according to ASTM F1249 and ASTM F1307, respectively.

Certain commercially-available products were used in the examples described below, including those outlined in Tables 1A and 1B:

TABLE 1A

POLYPROPYLENE POLYMERS

| Ref. # | Polymer | Manufacturer | Melt Flow (g/10 min.) | Description |
|---|---|---|---|---|
| PP-1 | PP4052 | ExxonMobil | 2 | Homopolymer, non-nucleated |
| PP-6 | Total PP 3927 | TotalEnergies | 60 | Homopolymer, nucleated |

TABLE 1B

HYDROCARBON RESINS

| Ref. # | Polymer | Manufacturer | Softening Point (° C.) |
|---|---|---|---|
| HCR-1 | Plastolyn™ R1140 | Synthomer | 140 |
| HCR-2 | Eastotac™ H142W | Synthomer | 142 |
| HCR-3 | Oppera™ PR 100A | ExxonMobil | 138 |

Example 1

In an example, the stiffness, max elongation, and impact strength of PP-1 were evaluated with the addition of a first hydrocarbon resin and without any hydrocarbon resins. In particular, a composition of about 100 wt % PP-1 was compared with a composition containing about 90 wt % PP-1 and about 10 wt % HCR-1. The results are shown below in in Table 2:

TABLE 2

|  | PP-1 | PP-1 + 10 wt % HCR-1 |
|---|---|---|
| Tensile Modulus (GPa) | 2.19 | 2.75 |
| Tensile Strength (MPa) | 37.4 | 44.3 |
| Max Elongation (%) | 55 | 13 |
| Impact Strength (J/m) | 27 | 10 |

Figure 5:
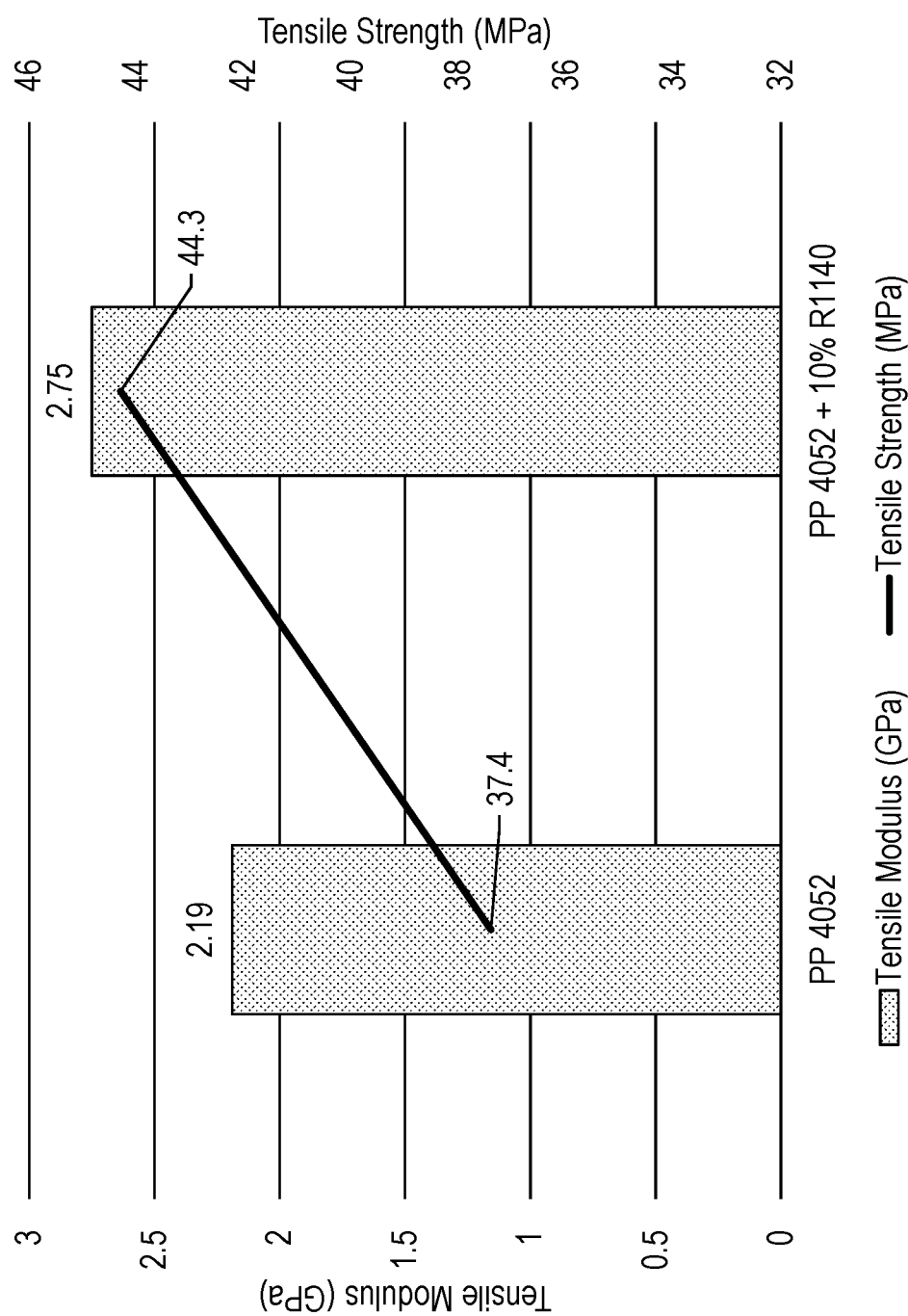
FIG. 5 is a plot illustrating tensile modulus and tensile strength of different polypropylene-containing compositions according to aspects of the present disclosure.
Figure 6:
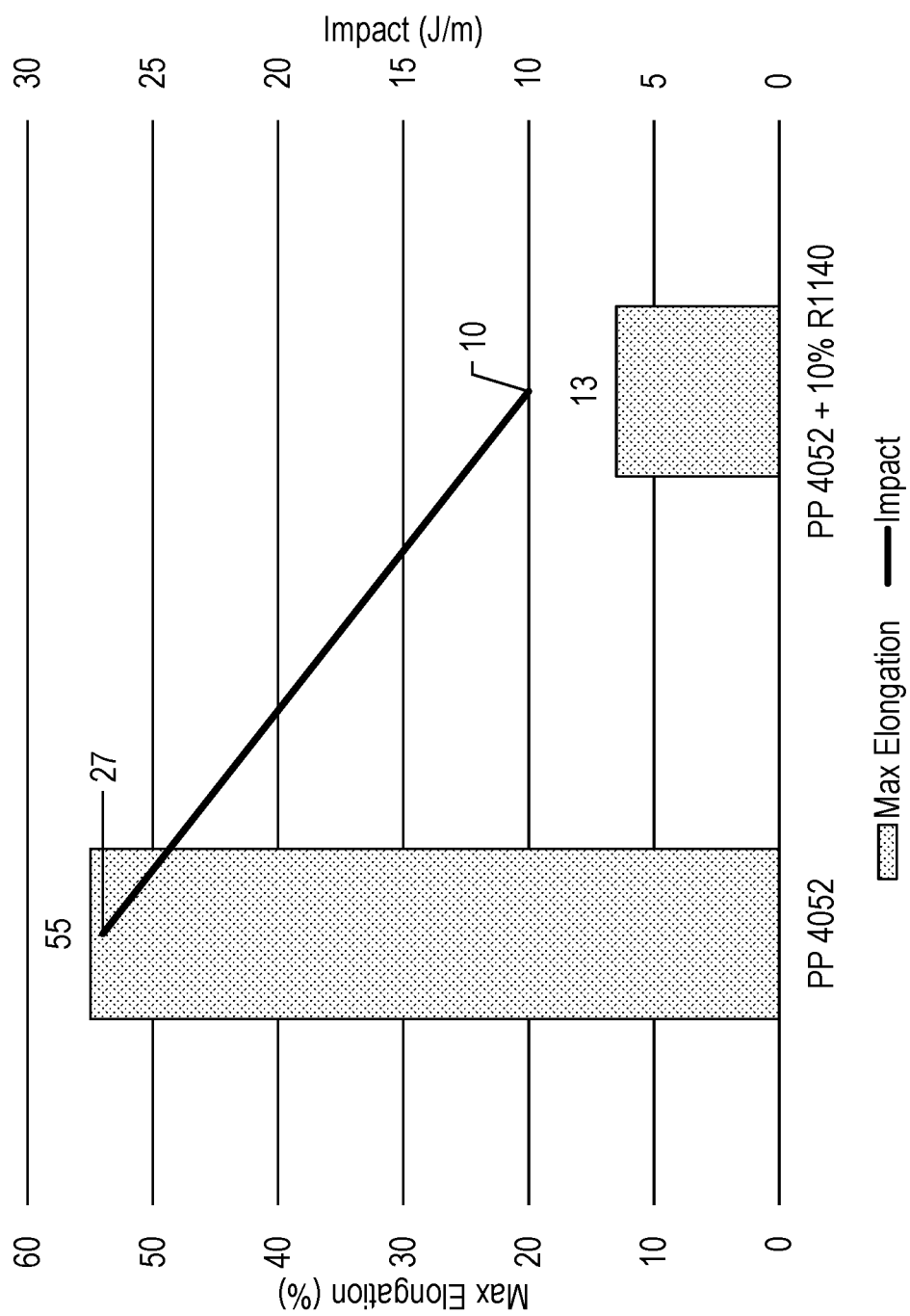
FIG. 6 is a plot illustrating max elongation and impact strength of different polypropylene-containing compositions according to aspects of the present disclosure.

The results shown in Table 2 are also illustrated graphically in FIGS. 5 and 6. As can be seen, a significant positive synergic effect can be observed on the stiffness, max elongation, and impact strength for the certain food packaging applications when including an amount of a hydrocarbon resin. In particular, both tensile strength and tensile modulus increase with the addition of the hydrocarbon resin, while max elongation and impact strength are significantly reduced. The combined increase in stiffness and decrease in maximum elongation and impact indicate that the composition is more brittle and more snappable (i.e., more like polystyrene in this regard).

Example 2

In an example, the addition of a hydrocarbon resin was evaluated at different loading levels with a blend of PP-1 and PP-6, the results of which are shown in Table 3 below:

TABLE 3

| Component | Units | Trial 1 | Trial 2 | Trial 3 | Trial 4 |
|---|---|---|---|---|---|
| PP-1 | wt % | 100 | 70 | 64 | 60 |
| PP-6 | wt % |  | 30 | 30 | 30 |
| HCR-1 | wt % |  |  | 6 | 10 |
| Properties | Units |  |  |  |  |
| Tensile Modulus | GPa | 2.19 | 2.75 | 3.22 | 3.38 |
| Tensile Strength | MPa | 37.4 | 43.2 | 44.4 | 45.8 |
| Max Elongation | % | 55 | 16 | 12 | 5 |
| Impact Strength | J/m | 27 | 15 | 14 | 7 |

Figure 7:
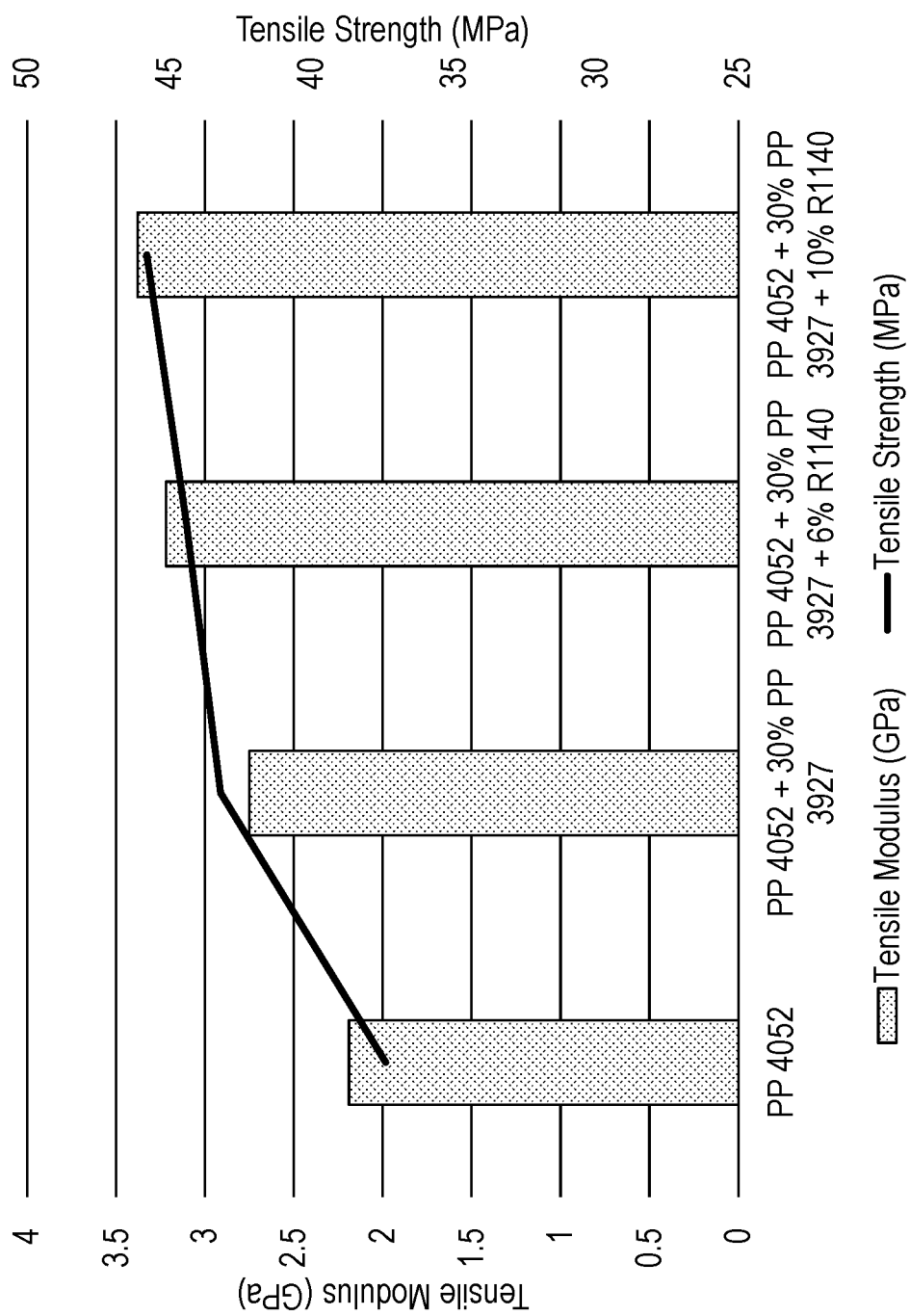
FIG. 7 is another plot illustrating tensile modulus and tensile strength of additional polypropylene-containing compositions according to aspects of the present disclosure.
Figure 8:
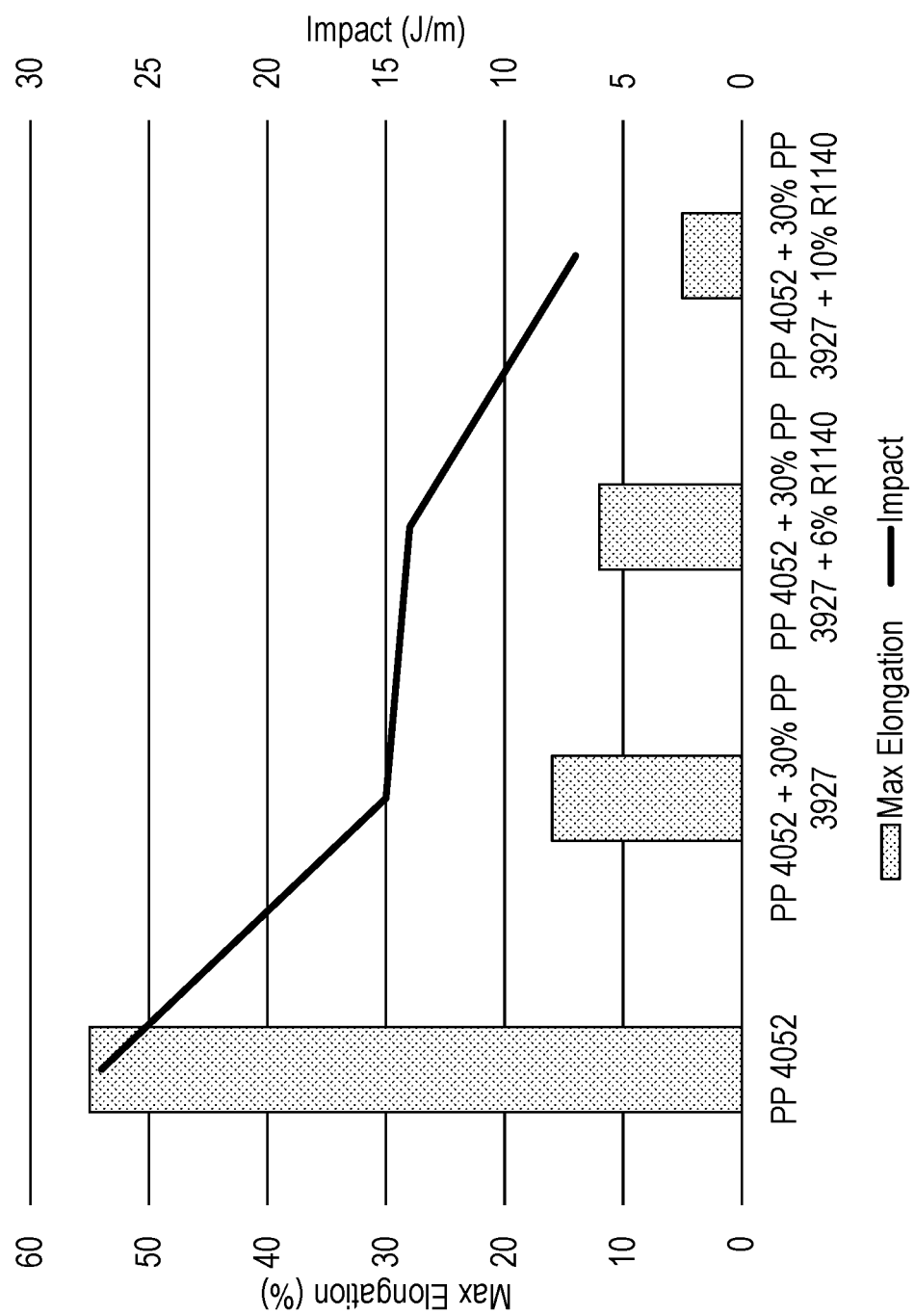
FIG. 8 is another plot illustrating max elongation and impact strength of additional polypropylene-containing compositions according to aspects of the present disclosure.

The results shown in Table 3 are also illustrated graphically in FIGS. 7 and 8. As can be seen, a significant positive synergic effect can be observed on the stiffness, max elongation, and impact strength for the certain food packaging applications when including an amount of a hydrocarbon resin. For example, the tensile modulus was increased from 2.19 GPa of Trial 1 to 2.75 GPa by blending PP-1 with 30 wt % of PP-6, then to 3.22 GPa by adding 6 wt % of HCR-1 on top of that. The tensile modulus can reach to 3.38 GPa with Trial 4, which is close to or higher than that of thermoforming-grade polystyrene. The same trend can also be observed as the tensile strength increases. Further, the reduction of both maximum elongation (elongation at break) and impact is also observed, as shown in FIG. 8. This indicates that Trials 2-4 can make sample more brittle, similar to that of polystyrene, thus enable snappability of a thermoformed food packaging article as may be desired for different products (e.g., multipack yogurt cups, etc.).

Example 3

In an example, certain barrier properties of the FCR compositions of the present disclosure were evaluated. In particular, the barrier properties water vapor transmission rate (WVTR) and oxygen transmission rate (OTR) were measured on an extruded sheet of food packaging material (according to the trials outlines below), the results of which are shown in Table 4 below. MOCON OX-Tran 2/40 was used for OTR measurement and MOCON AQUATRAN 3/40 was used for WVTR measurement.

TABLE 4

| Component | Units | Trial 1 | Trial 2 | Trial 3 | Trial 4 |
|---|---|---|---|---|---|
| PP-1 | wt % | 100 | 90 | 70 | 60 |
| PP-6 | wt % |  |  | 30 | 30 |
| HCR-1 | wt % |  | 10 |  | 10 |
| Properties | Units |  |  |  |  |
| WVTR @ 50% RH | g/100 in$^2$/48 hr | 0.005596 | 0.00334 | 0.00468 | 0.003944 |
| OTR @ 20.9% O$_2$ | cc/pkg/24 hr | 0.07445 | 0.00468 | 0.0577 | 0.04055 |

Figure 9:
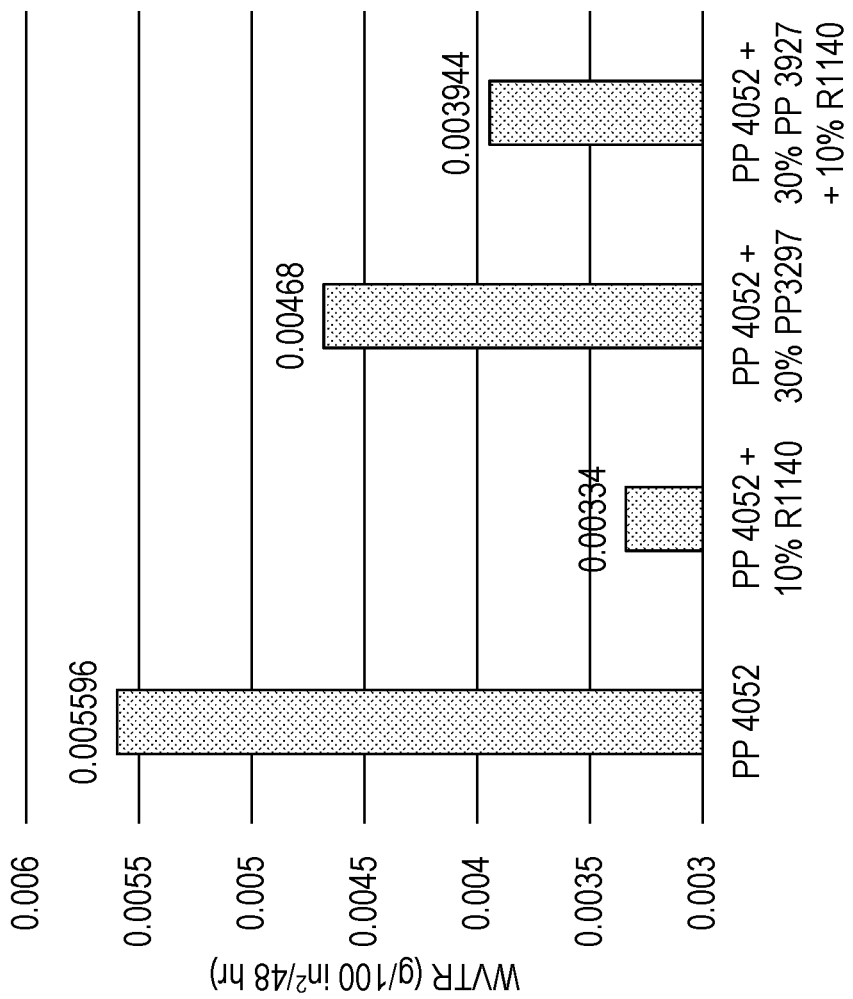
FIG. 9 is a plot illustrating the water vapor transmission rate of different polypropylene-containing compositions according to aspects of the present disclosure.
Figure 10:
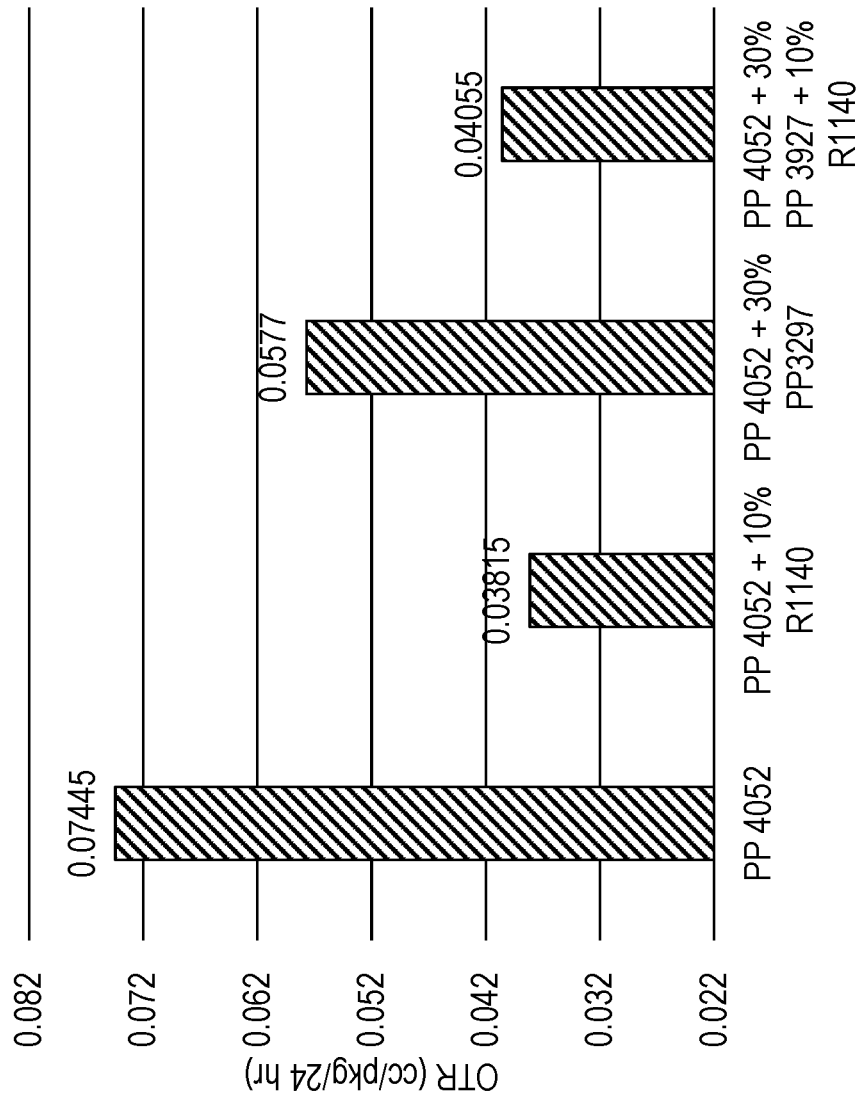
FIG. 10 is a plot illustrating the oxygen transmission rate of different polypropylene-containing compositions according to aspects of the present disclosure.

The results shown in Table 4 are also illustrated graphically in FIGS. 9 and 10. As can be seen, a meaningful reduction in both WVTR and OTR is observed, which transmissions being reduced up to about 50%.

Example 4

In an example, the optical properties of several compositions were evaluated. In particular, the haze property was measured for several compositions, the results of which are shown in Table 5 below:

TABLE 5

| Component | Units | Trial 1 | Trial 2 | Trial 3 | Trial 4 |
|---|---|---|---|---|---|
| PP-1 | wt % | 100 | 90 | 70 | 60 |
| PP-6 | wt % | | | 30 | 30 |
| HCR-1 | wt % | | 10 | | 10 |
| Properties | Units | | | | |
| Haze | % | 83.7 | 75.3 | 62.8 | 51.6 |

Figure 11:
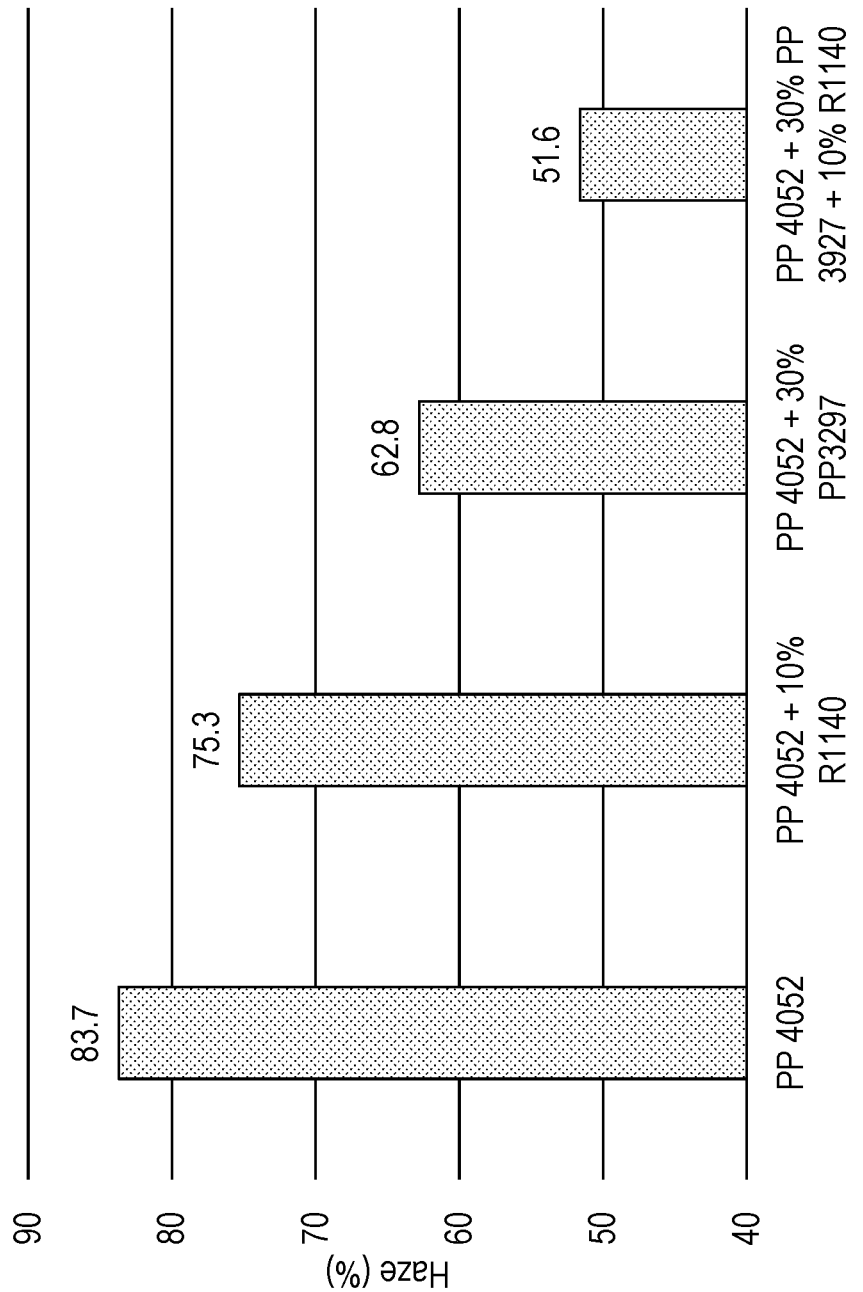
FIG. 11 is a plot illustrating the haze values of different polypropylene-containing compositions according to aspects of the present disclosure.

The results shown in Table 5 are also illustrated graphically in FIG. 11. As can be seen, a meaningful reduction in haze percentage is observed, which indicates those compositions can be used to produce more transparent and smooth products with many benefits compared to that of polystyrene such as easy to see clarity.

Examples 5-10

All measurements for the following examples were taken at room temperature (~23° C.) unless noted herein or otherwise specified in the corresponding standard protocol. Stiffness of the compositions was evaluated by measuring flexural modulus (MD and TD) according to ASTM D790 at 1% secant. Multiaxial impact properties were evaluated by measuring peak force and total energy according to ISO-6603-2 at 2.2 meters/second. Clarity was evaluated by measuring haze of the composition in various forming according to ASTM D1003. Melt flow rate was measured according to ASTM D1238. And shrinkage was evaluated by measuring rim diameter of the conditioned cups versus the diameter of the thermoforming mold.

Example 5

In an example, certain commercially-available polypropylene compositions were evaluated with and without 1 wt % of a nucleating agent. The nucleating agent used was UltraBalance™ Solution Natural 10359 by Milliken® and the polypropylenes were provided as illustrated in Table 6A below. The results are shown in Table 6B.

TABLE 6A

| Ref. # | Polymer | Manufacturer | Melt Flow (g/10 min.) | Description |
|---|---|---|---|---|
| PP-1 | PP4052 | ExxonMobil | 2 | Homopolymer, non-nucleated |
| PP-2 | PP6282NE | ExxonMobil | 1.8 | HMS PP, nucleated |
| PP-3 | PP6272 | ExxonMobil | 2.8 | Homopolymer, nucleated |
| PP-4 | PP 561P | SABIC | 2.5 | HMS PP, non-nucleated |
| PP-5 | 6021WN | Braskem America, Inc. | 2 | Random copolymer, nucleated |
| PP-6 | Total PP 3927 | TotalEnergies | 60 | Homopolymer, nucleated |

TABLE 6A-continued

| Ref. # | Polymer | Manufacturer | Melt Flow (g/10 min.) | Description |
|---|---|---|---|---|
| PP-7 | Total PP 3270 | TotalEnergies | 2 | Homopolymer, non-nucleated |
| PP-8 | CH550LN | Philips 66 | 55 | Homopolymer, nucleated |
| PP-9 | FP650WV | Braskem America, Inc. | 65 | Homopolymer, nucleated |

TABLE 6B

| | Flex Modulus (MPa) | |
|---|---|---|
| Ref. # | without NA-1 | with 1 wt % NA-1 |
| PP-1 | 1740 | 1970 |
| PP-2 | 2081 | 2114 |
| PP-3 | 1738 | 1787 |
| PP-4 | 1970 | 1859 |
| PP-5 | 1752 | 1786 |

Figure 12:
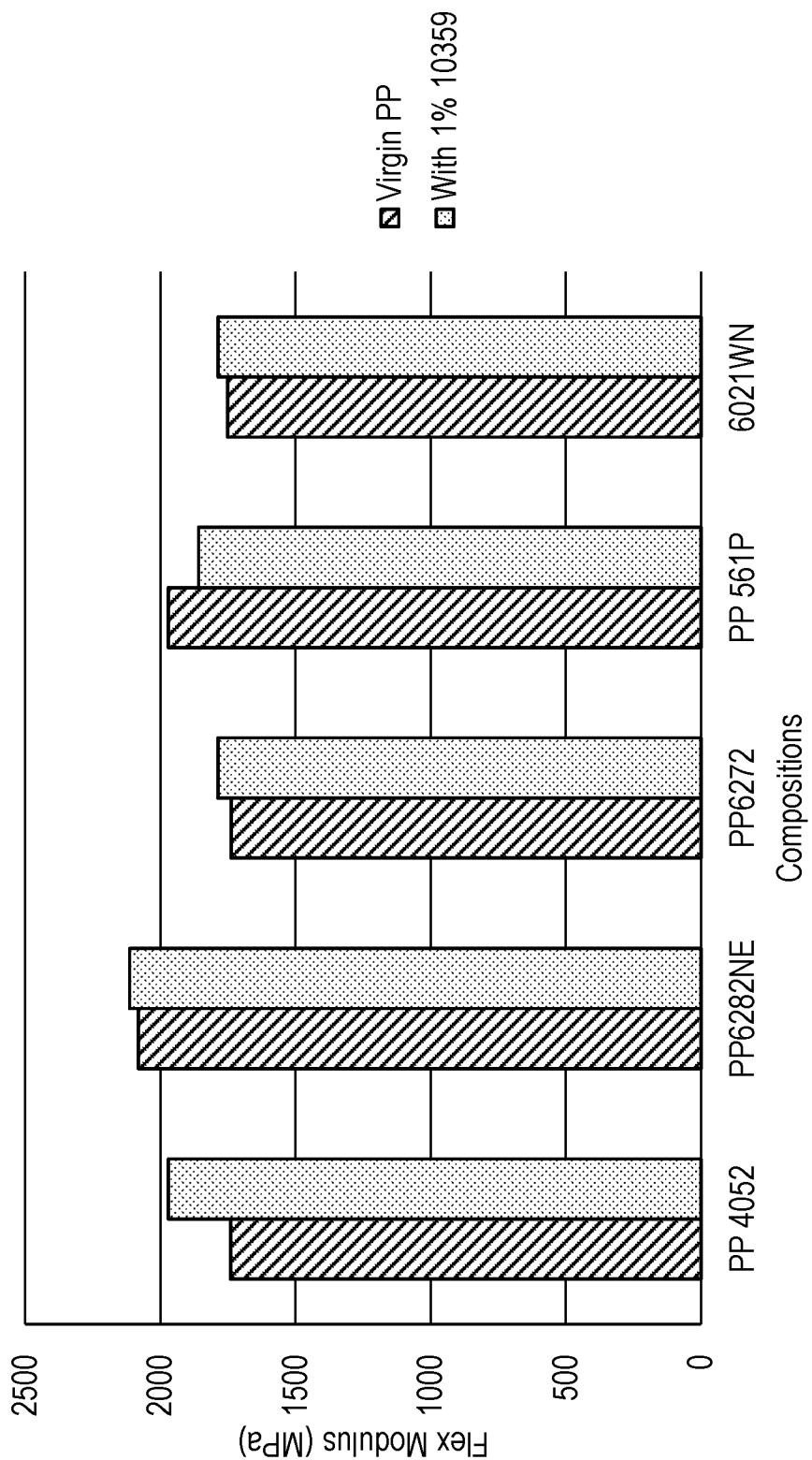
FIG. 12 is a plot illustrating the flexural modulus of different polypropylene-containing compositions according to further aspects of the present disclosure.

The results shown in Table 6B are also illustrated graphically in FIG. 12. These results suggest that adding a nucleating agent to a polypropylene-containing composition that does not already include a nucleating agent (e.g., adding a nucleating agent to a non-nucleated composition) can increase the composition's stiffness significantly, as shown with respect PP-1 whereby adding 1 wt % NA-1 increased the composition's stiffness by about 13.2%. Without being limited by theory, it is possible that similar results were not seen for PP-4 because PP-4 is a special polypropylene grade with enhanced high melt strength and may contain more residue and long chains that already serve as nucleating points.

Example 6

In an example, PP-1 was further loaded with additional nucleating agent and the composition's stiffness was re-evaluated, as shown in Table 7.

TABLE 7

| | Flex Modulus (MPa) | | |
|---|---|---|---|
| Ref. # | without NA-1 | with 1 wt % NA-1 | with 2 wt % NA-1 |
| PP-1 | 1740 | 1970 | 2006 |

Figure 13:
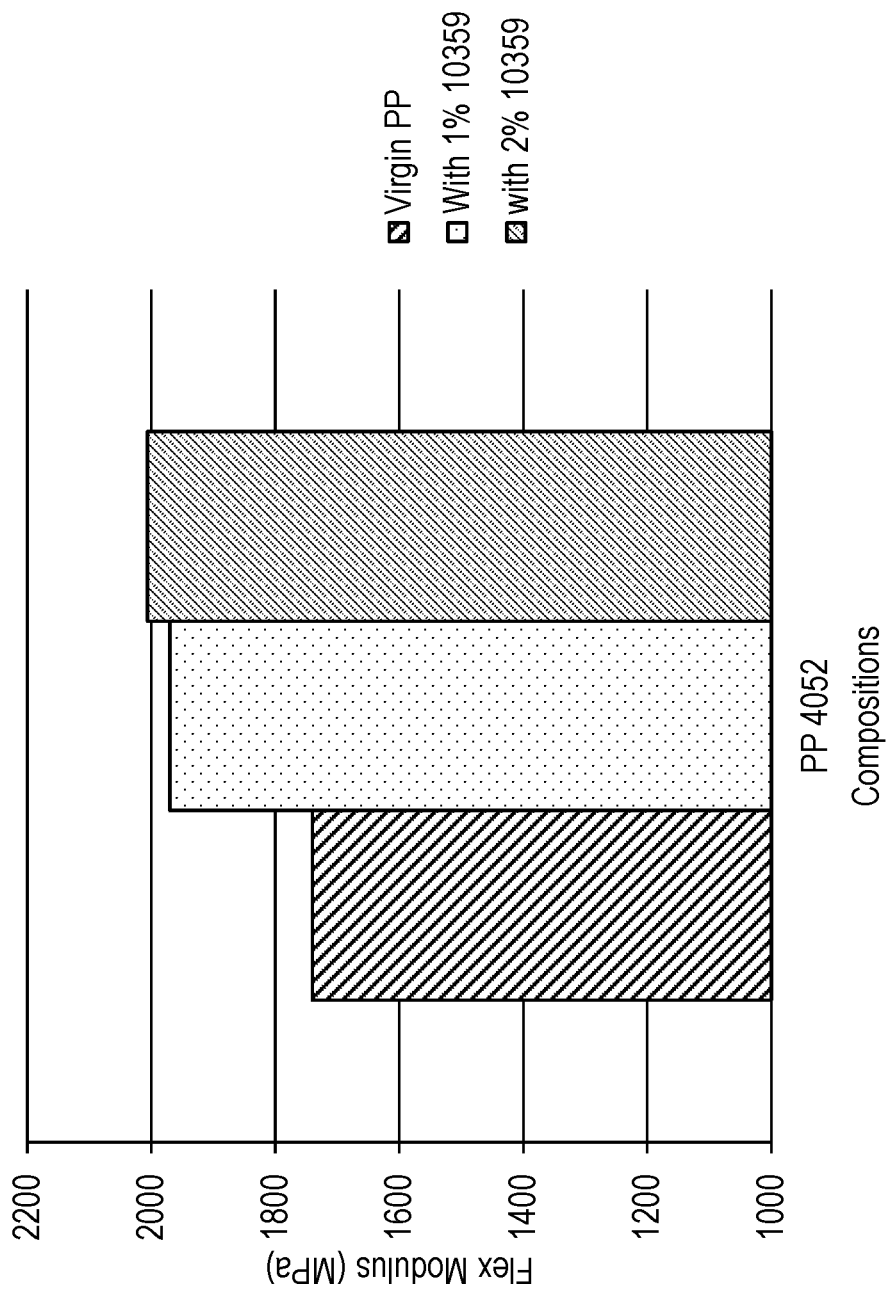
FIG. 13 is a plot illustrating the flexural modulus of a polypropylene composition containing different amounts of a nucleating agent according to further aspects of the present disclosure.

The results shown in Table 7 are also illustrated graphically in FIG. 13. As shown herein, the addition of 1 wt % NA-1 to PP-1 increases its stiffness by about 13.2%, adding an additional 1 wt % of NA-1 only increasing the stiffness of the resulting composition by about 1.8%. In other words, adding 1 wt % of a nucleating agent increased the composition's stiffness by about 13.2% while adding double that amount (i.e., 2 wt % of a nucleating agent) increased the composition's stiffness by 15.3% when compared with the base composition. These results indicate that the use of a nucleating agent can only improve the stiffness of the relevant compositions by a certain extent.

Example 7

In an example, a first and a second polypropylene were blended and evaluated for changes in stiffness. In particular different amounts of PP-6 were separately blended with, PP-1, PP-4, and PP-5 and tested as shown below in Table 3. PP-6 has a higher melt flow rate of 60 g/10 min. and already contains a nucleating agent (i.e., is nucleated).

TABLE 8

| | Flex Modulus (MPa) | | |
| --- | --- | --- | --- |
| Ref. # | without PP-6 | with 10 wt % PP-6 | with 20 wt % PP-6 |
| PP-1 | 1740 | 2247 | |
| PP-4 | 1970 | 2089 | 2098 |
| PP-5 | 1752 | 1904 | |

Figure 14:
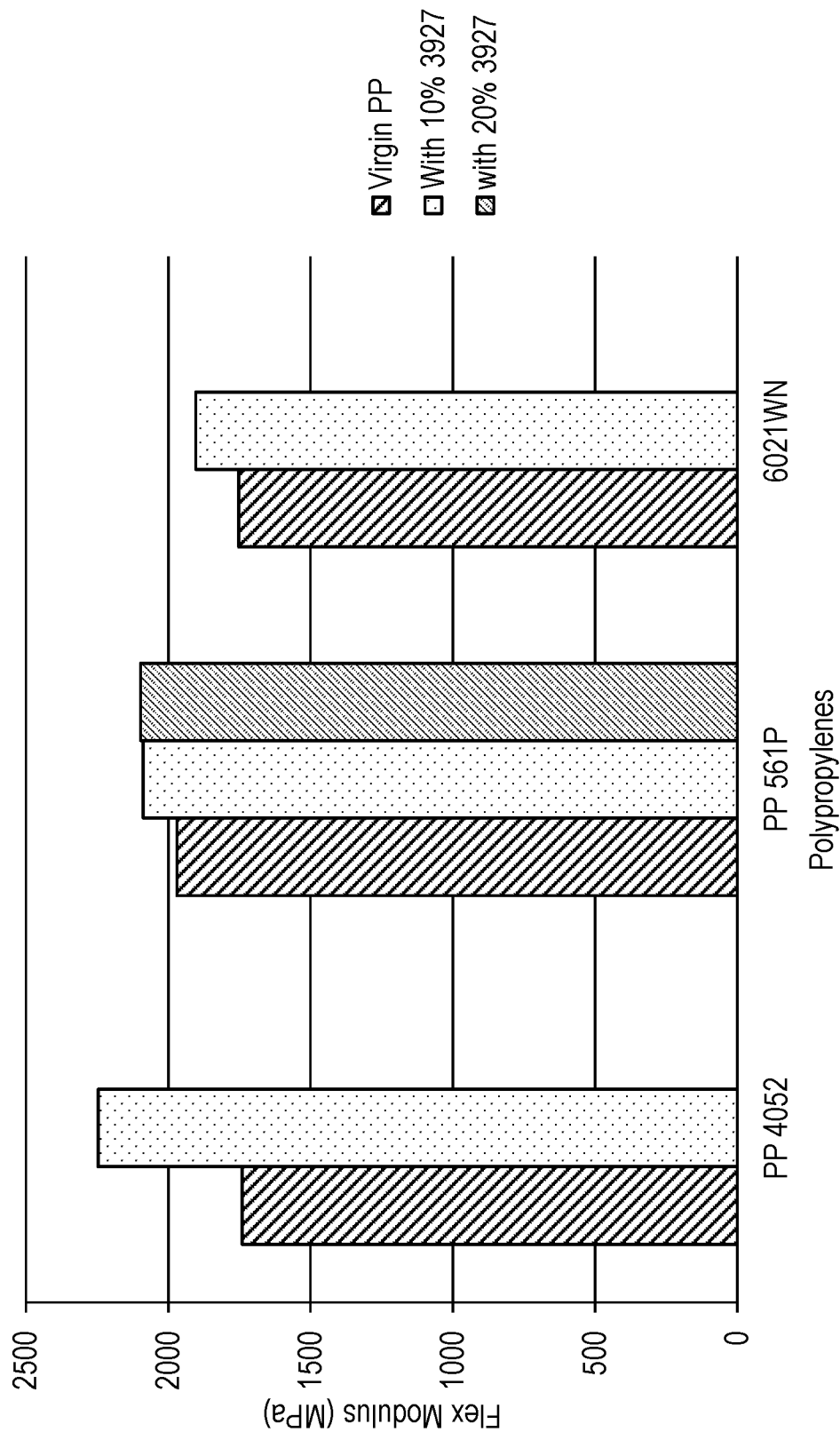
FIG. 14 is a plot illustrating the flexural modulus of different compositions containing a first polypropylene and a second polypropylene according to further aspects of the present disclosure.

The results shown in Table 8 are also illustrated graphically in FIG. 14. As shown herein, the addition PP-6 can improve the stiffness of compositions, including nucleated and non-nucleated compositions such as PP-4 and PP-5, which saw increases of between about 6% and about 10%. However, by blending 10 wt % of PP-6 with PP-1, it was surprisingly found that the flexural modulus increased from about 1740 MPa to about 2247 MPa, which is an increase of approximately 30%.

Example 8

In an example, additional formulations with polypropylene blends and different loading of nucleating agents (listed in Table 9 in wt %) were extruded as sheets and later thermoformed into cups. According to this example, a second nucleating agent, UltraView Solution Natural 10034 from Milliken® (NA-2) was tested in addition to NA-1. The extruded sheets and thermoformed cups were evaluated based on certain mechanical and optical properties, as shown in Table 9 below.

TABLE 9

| Component | | Sheet 1 | Sheet 2 | Sheet 3 |
| --- | --- | --- | --- | --- |
| PP-1 | | 90 | 89.3 | 89.3 |
| PP-6 | | 10 | 8.9 | 8.9 |
| NA-1 | | | 1.8 | |
| NA-2 | | | | 1.8 |
| Properties | Unit | | | |
| Stiffness | | | | |
| Flexural Modulus (MD) | MPa | 2157 | 2215 | 2218 |
| Flexural Modulus (TD) | MPa | 2143 | 2175 | 2231 |
| Multiaxial Impact (at 23° C.) | | | | |
| Peak force | Newtons | 2066 | 1622 | 2151 |
| Total energy | Joules | 12.7 | 6.2 | 16.8 |
| Physical | | | | |
| Shrinkage (rim diameter) | % | 2.09 | 2.16 | 2.04 |

TABLE 9-continued

| Optical | | | | |
| --- | --- | --- | --- | --- |
| Haze (sheet) | % | 76.2 | 100 | 61.4 |
| Haze (cup) | % | 17.5 | 58.2 | 11.2 |

Figure 15:
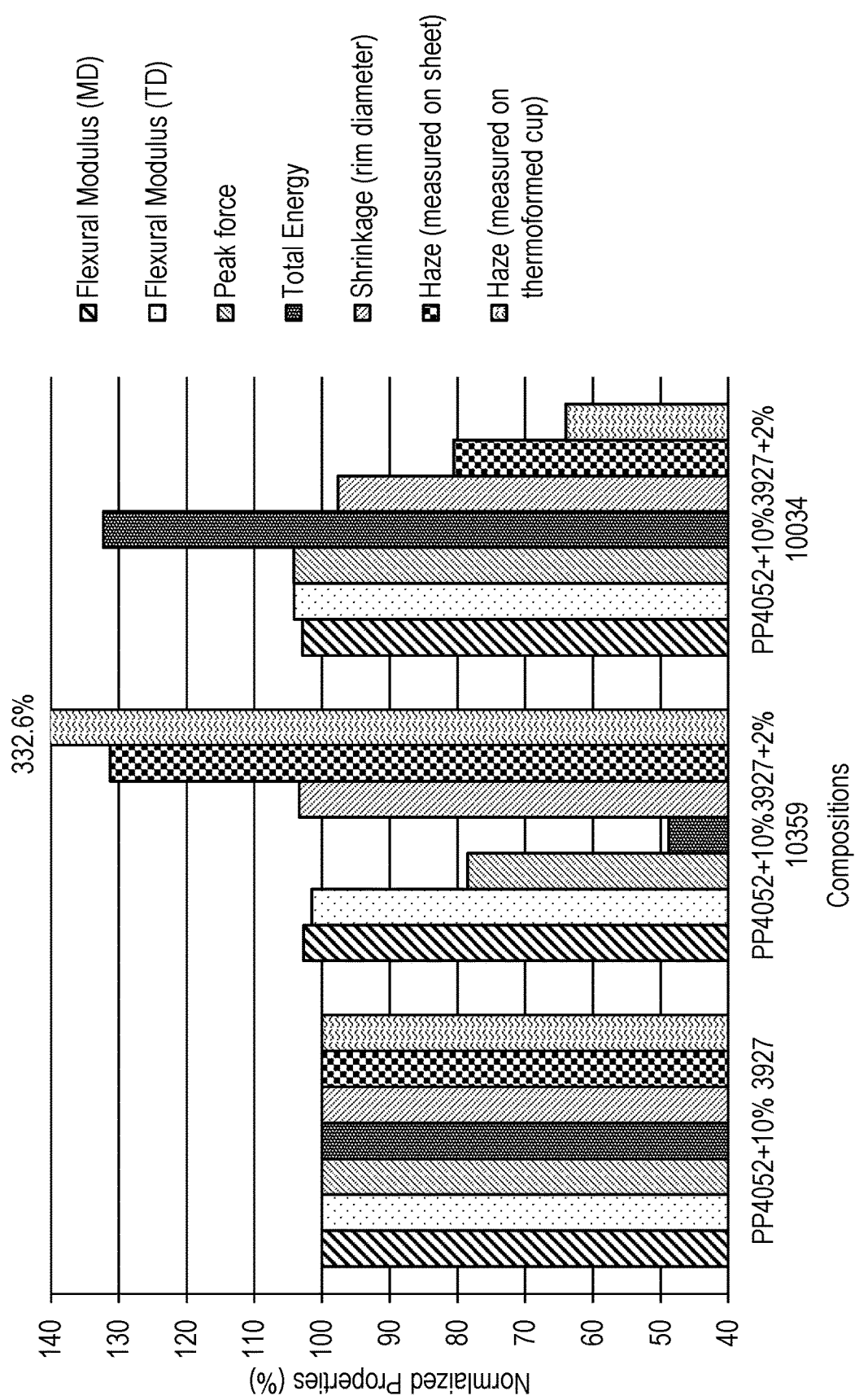
FIG. 15 is a plot illustrating various properties of different polypropylene-containing compositions according to further aspects of the present disclosure.

The results shown in Table 9 are also illustrated graphically in FIG. 15. As shown, adding about 1.8 wt % of NA-2 improved the stiffness of the extruded sheet samples. Further, NA-2 improved the impact strength of the sheet and reduced the haze value significantly in addition to improving the shrinkage.

Example 9

In another example, additional polypropylene blends (listed in Table 10 in wt %) were created and evaluated according to ASTM D638. In particular, five polypropylene formulations were injection molded into Type I dogbones, and evaluated for tensile modulus, tensile strength, and max elongation (at a speed of 50 mm/min and 5 repetitions per formulation). More specifically, two comparative examples containing about 100 wt % of PP-1 and about 100 wt % of PP-7 were compared with the examples as shown in Table 10 below:

TABLE 10

| | | | | Inventive Examples | | |
| --- | --- | --- | --- | --- | --- | --- |
| Component | | C1 | C2 | IB-1 | IB-2 | IB-3 |
| PP-1 | | 100 | | 68 | | |
| PP-7 | | | 100 | | 68 | 89 |
| PP-6 | | | | 30 | 30 | 10 |
| NA-2 | | | | 2 | 2 | 1 |
| Properties | Unit | | | | | |
| Mechanical Properties | | | | | | |
| Tensile Modulus | GPa | 2.19 | 2.03 | 2.37 | 2.37 | 2.35 |
| Tensile Strength | MPa | 37.4 | 39.7 | 38.3 | 41.5 | 41.8 |
| Max Elongation | % | 55 | 119 | 28 | 50 | 65 |

From Table 10, it can be seen that similar trends in stiffness and max elongation are exhibited for compositions containing both PP-1 and PP-7. For example, adding an amount of PP-6 and an amount of the nucleating agent NA-2 increased tensile modulus and tensile strength while significant decreasing max elongation.

Example 10

In another example, additional polypropylene blends (listed in Table 11 in wt %) were created and evaluated according to ASTM D638. In particular, eight polypropylene formulations were injection molded into Type I dogbones, and evaluated for tensile modulus, tensile strength, and max elongation (at a speed of 50 mm/min and 5 repetitions per formulation). More specifically, a comparative example containing about 100 wt % of PP-1 was compared with the examples containing a second polypropylene (e.g., PP-6, PP-8, or PP-9) and a nucleating agent NA-2 or NA-3 (Ultraclear 120B by Milliken®) as shown in Table 11 below:

TABLE 11

| | | Inventive Examples | | | | | | |
| --- | --- | --- | --- | --- | --- | --- | --- | --- |
| Component | C1 | IB-1 | IB-4 | IB-5 | IB-6 | IB-7 | IB-8 | IB-9 |
| PP-1 | 100 | 68 | 89 | 68 | 68 | 89 | 68 | 89 |
| PP-6 | | 30 | 10 | | | | | |
| PP-8 | | | | 30 | 30 | 10 | | |

TABLE 11-continued

| | | | | | | | | | |
|---|---|---|---|---|---|---|---|---|---|
| PP-9 | | | | | | | | 30 | 10 |
| NA-2 | | | 2 | 1 | | 2 | 1 | 2 | 1 |
| NA-3 | | | | | 2 | | | | |
| Properties | Unit | | | | | | | | |
| Mechanical Properties | | | | | | | | | |
| Tensile Modulus | GPa | 2.19 | 2.37 | 2.4 | 2.33 | 2.42 | 2.45 | 2.53 | 2.62 |
| Tensile Strength | MPa | 37.4 | 38.3 | 38.6 | 41.6 | 43.5 | 41.9 | 41.8 | 41.8 |
| Max Elongation | % | 55 | 28 | 23 | 37 | 19 | 29 | 48 | 56 |

From Table 11, it can be seen that similar trends in stiffness (as measured by tensile modulus and tensile strength) and max elongation are exhibited for polypropylene compositions containing either PP-6, PP-8, or PP-9. For example, comparative example 1 (C1) containing about 100 wt % has a tensile modulus of about 2.19 GPa, a tensile strength of about 37.4 MPa, and a max elongation of about 55%. In comparison, inventive blends IB-1, IB-6, and IB-8 containing about 30 wt % of PP-6, PP-8, and PP-9, respectively, exhibit an increase in tensile modulus by from about 0.18 GPa to about 0.34 GPa, an increase in tensile strength by from about 0.9 MPa to about 6.1 MPa, and a decrease in max elongation by from about 7% to about 36%. Further, inventive blends IB-4, IB-7, and IB-9 containing about 10 wt % of PP-6, PP-8, and PP-9, respectively, exhibit an increase in tensile modulus by from about 0.21 GPa to about 0.43 GPa, an increase in tensile strength by from about 1.2 MPa to about 4.5 MPa, and a decrease in max elongation by from about 26% to about 32% (except for IB-9, which exhibited a max elongation of about 56%, roughly the same as CB-1).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. Unless otherwise defined, all technical and scientific terms used herein have the same meaning as commonly understood by one of ordinary skill in the art. The materials, methods, and examples disclosed herein are illustrative only and not intended to be limiting.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "first", "second", "third", and the like, as used herein, do not denote any order, quantity, or importance, but rather are used to distinguish one element from another.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule.

The term "homopolymer" as used herein refers to a polymer derived from only one structural unit or monomeric species.

The term "copolymer" refers to a polymer derived from two or more structural unit or monomeric species, as opposed to a homopolymer, which is derived from only one structural unit or monomer.

The term "hydrocarbon" refers to an organic compound consisting entirely of hydrogen and carbon atoms. As used herein, a "saturated hydrocarbon" contains only single bonds between carbon atoms, while an "unsaturated hydrocarbon" contains a double or a triple bond between two adjacent carbon atoms.

The term "hydrocarbon resin" generally refers to a low molecular weight (e.g., having a molar mass of about 400 g/mol to about 5000 g/mol) thermoplastic polymer produced by polymerization of unsaturated hydrocarbons. Hydrocarbon resins of the present disclosure generally have a high glass transition temperature but hardens at room temperature. Hydrocarbon resins of the present disclosure may be aliphatic or aromatic.

The term "aliphatic" refers to a linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

It should be appreciated that during molding or fabrication processes, polymer compositions can undergo polymer crystal growth at a plurality of nucleation sites. As used herein, the term "nucleating agent" describes compounds and/or compositions that may be added to polymers that provide additional nucleation sites (i.e., facilitate nucleation at additional locations) for polymer crystal growth during the cooling stage(s) of such molding and/or fabrication processes.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius. The glass transition temperatures (Tg) described herein are measures of heat resistance of, for example, polycarbonate and polycarbonate blends. The Tg can be determined by differential scanning calorimetry, for example by using a TA Instruments Q1000 instrument, for example, with setting of 20° C./min ramp rate and 40° C. start temperature and 200° C. end temperature.

The term "snappability" as used herein refers to the ability of a solid material to break-off into discrete components or parts upon application of a force within a generally known range. For example, a multipack of connected yogurt cups formed from a snappable material will readily allow a consumer to break-off an individual cup from the multipack at a desired snappable portion or joint.

The term "haze" refers to the percentage of transmitted light, which in passing through a specimen deviates from the incident beam by forward scattering. Percent (%) haze may be measured according to ASTM D 1003.

The term "Melt Volume Rate" (MVR) or "Melt Flow Rate (MFR)" refers to the flow rate of a polymer in a melt phase as determined using the method of ASTM D1238. The MVR of a molten polymer is measured by determining the amount of polymer that flows through a capillary of a specific temperature over a specified time using standard weights at a fixed temperature. MVR is expressed in cubic centimeter per 10 minutes, and MFR is expressed in grams per 10 minutes. The higher the MVR or MFR value of a polymer at a specific temperature, the greater the flow of that polymer at that specific temperature.

It should also be understood that, unless clearly indicated to the contrary, in any methods claimed herein that include more than one step or act, the order of the steps or acts of the method is not necessarily limited to the order in which the steps or acts of the method are recited.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Additionally, for the recitations of numeric amounts and ranges herein, terms such as "less than about X" and "at least about X" should be interpreted as also explicitly disclosing "about X". For example, "less than about 3 g/10 min."

expressly contemplates "about 3 g/10 min.", and "at least 60 g/10 min." expressly contemplates "about 60 g/10 min."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A food contact material composition comprising:
   from about 60 wt % to about 99 wt % of a first polypropylene having a melt flow rate of less than about 5 grams/10 minutes, according to ASTM D1238;
   from about 1 wt % to about 40 wt % of a second polypropylene having a melt flow rate of at least 35 grams/10 minutes, according to ASTM D1238; and
   from about 6 wt % to about 20 wt % of a hydrocarbon resin.

2. The food contact material composition of claim 1, wherein the food contact material composition comprises from about 6 wt % to about 12 wt % of the hydrocarbon resin.

3. The food contact material composition of claim 1, wherein the food contact material composition has a haze value of less than about 80% when extruded as a sheet having a thickness of about 47 mils, measured according to ASTM D1003.

4. The food contact material composition of claim 1, further comprising from about 0.02 wt % to about 5 wt % of a nucleating agent.

5. An article being formed from the food contact material composition of claim 1.

6. The article of claim 5, wherein the article has a surface suitable for contacting a food product that is transparent and has a thin wall having a cross-sectional thickness of 3 mm or less.

7. A method of manufacturing a food packaging article suitable for contacting a food product, the method comprising:
   forming a batch mixture comprising a food contact material composition;
   extruding the batch mixture into a processable form, wherein extruding the batch mixture into a processable form comprises extruding the batch mixture into a sheet; and
   forming a fillable food packaging article from the processable form of the batch mixture by thermoforming the extruded sheet into a desired shape, wherein the fillable food packaging article comprises an opening for receiving a foodstuff;
   wherein the food contact material composition comprises from about 60 wt % to about 99 wt % of a first polypropylene having a melt flow rate of less than about 5 grams/10 minutes, according to ASTM D1238, from about 1 wt % to about 40 wt % of a second polypropylene having a melt flow rate of at least about 35 grams/10 minutes, according to ASTM D1238, and from about 0.1 wt % to about 20 wt % of a hydrocarbon resin.

8. The method of claim 7, wherein the fillable food packaging article has sidewalls having a thickness of between about 2 mm and about 5 mm.

9. The method of claim 7, further comprising:
   filling the fillable food packaging article with a food product via the opening of the fillable food packaging article; and
   sealing the opening of the fillable food packaging article to form a final food packaging article.

10. The method of claim 7, wherein the extruded sheet is thermoformed into the desired shape at a temperature of about 165° C. or less.

11. The food contact material composition of claim 1, wherein the food contact material composition has a machine direction (MD) flexural modulus or a transverse direction (TD) flexural modulus of at least about 2100 MPa when measured according to ASTM D790 (1% secant, about 23° C.).

12. The food contact material composition of claim 1, wherein the food contact material composition has a multiaxial impact peak force of at least 2000 Newtons when measured according to ISO-6603-2 (at 2.2 meters/second) or has a multiaxial impact total energy of at least 12 Joules when measured according to ISO 6603-2 (at 2.2 meters/second).

13. The food contact material composition of claim 1, wherein the food contact material composition has a haze value of less than about 20% when thermoformed into a thin-walled cup having a wall thickness of about 10 mils and measured according to ASTM D1003.

14. The food contact material composition of claim 1, wherein the hydrocarbon resin has a softening point of from about 130° C. to about 150° C., measured according to ASTM E28.

15. The article of claim 5, wherein the article has a tensile modulus of at least about 2.5 GPa, measured according to ASTM D638.

16. The article of claim 5, wherein the article has a tensile strength of at least about 40 MPa, measured according to ASTM D638.

17. The article of claim 5, wherein the article has an Izod impact strength of less than about 20 J/m, measured according to ASTM D256.

18. The article of claim 5, wherein the article has a max elongation of less than 50%, measured according to ASTM D638.

19. The article of claim 5, wherein the article has at least one of a tensile modulus of at least about 2.5 GPa, measured according to ASTM D638, and a tensile strength of at least about 40 MPa, measured according to ASTM D638, and has at least one of an Izod impact strength of less than about 20 J/m, measured according to ASTM D256 and a max elongation of less than 50%, measured according to ASTM D638.

20. The article of claim 5, wherein the article has a water vapor transmission rate (WVTR) of less than 0.005 g/100 in$^2$/48 hr, measured according to ASTM F1249.

21. The article of claim 5, wherein the article has an oxygen transmission rate (OTR) of less than 0.07 cc/pkg/24 hr, measured according to ASTM F1307.

* * * * *